US010755304B2

(12) United States Patent
Malek et al.

(10) Patent No.: US 10,755,304 B2
(45) Date of Patent: Aug. 25, 2020

(54) SAMPLE SIZE DETERMINATION IN SEQUENTIAL HYPOTHESIS TESTING

(71) Applicant: Adobe Inc., San Jose, CA (US)

(72) Inventors: Alan John Malek, Los Gatos, CA (US); Yinlam Chow, San Mateo, CA (US); Mohammad Ghavamzadeh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 554 days.

(21) Appl. No.: 15/148,390

(22) Filed: May 6, 2016

(65) Prior Publication Data
US 2017/0323331 A1    Nov. 9, 2017

(51) Int. Cl.
*G06Q 30/02*    (2012.01)
(52) U.S. Cl.
CPC ................ *G06Q 30/0246* (2013.01)
(58) Field of Classification Search
CPC .................................................. G06Q 30/0246
See application file for complete search history.

(56) References Cited

U.S. PATENT DOCUMENTS

| 8,849,975 B2 | 9/2014 | Brayman |
| 10,699,294 B2 | 6/2020 | Katariya et al. |
| 2003/0204368 A1* | 10/2003 | Ertin .................. G06K 9/6262 702/179 |
| 2010/0257146 A1* | 10/2010 | Memon ................. G06F 3/0647 707/693 |
| 2016/0077672 A1* | 3/2016 | Anderson ........... G06F 16/9577 715/234 |
| 2017/0083429 A1* | 3/2017 | Pekelis ............... G06F 11/3612 |
| 2017/0323329 A1 | 11/2017 | Katariya et al. |
| 2018/0129760 A1* | 5/2018 | Kazerouni ......... G06Q 30/0242 |
| 2019/0180866 A1* | 6/2019 | Chen .................. G06Q 10/0631 |

OTHER PUBLICATIONS

"Simple Sequential A/B Testing", by Evan Miller. https://www.evanmiller.org/sequential-ab-testing.html. Oct. 13, 2015. pp. 1-14. (Year: 2015) (hereinafter Miller).*
"A review of modern multiple hypothesis testing, with particular attention to the false discovery proportion", by Alessio Farcomeni. Statistical Methods in Medical Research 2008; 17:347-388. 2008 SAGE Publications. (Year: 2008) (hereinafter Farcomeni).*
"Statistics for the Internet Age: The Story Behind Optimizely's New Stats Engine", by Leonid Pekelis. Jan. 20, 2015. (Year: 2015).*

(Continued)

*Primary Examiner* — William A Brandenburg
(74) *Attorney, Agent, or Firm* — SBMC

(57) ABSTRACT

Sample size determination techniques in sequential hypothesis testing in a digital medium environment are described. The sample size may be determined before a test to define a number of samples (e.g., user interactions with digital marketing content) that are likely to be tested as part of the sequential hypothesis testing in order to achieve a result. The sample size may also be determined in real time to define a number of samples that likely remain for testing in order to achieve a result. The sample size may be determined in a variety of ways, such as through simulation, based on a gap between conversion rates for different options being tested, and so on.

20 Claims, 11 Drawing Sheets

(56) References Cited

OTHER PUBLICATIONS

"Simple Sequential A/B Testing", by Evan Miller, https://www.evanmiller.org/sequential-ab-testing.html.Oct. 13, 2015. (Year: 2015).*

"Multiple Multistage Hypothesis Tests: A Sequential Detection Approach To Target Tracking", by Haydn Scott Richardson. Thesis Submission, Queen's University. Jun. 1992. (Year: 1992).*

"Asymptotically optimal, sequential, multiple testing procedures with prior information on the number of signals", by Song et al. Department of Statistics, Coordinated Science Lab. University of Illinois (Urbana-Champaign). Jul. 20, 2016. (Year: 2016).*

"Active Sequential Hypothesis Testing", by Naghshvar et al. Qualcomm Inc. and University of California (San Diego). Dec. 18, 2013. (Year: 2013).*

Benjamini,"False discovery rate{adjusted multiple confidence intervals for selected parameters", Journal of the American Statistical Association, 100 (469), Jul. 15, 2012, 11 pages.

"First Action Interview Office Action", U.S. Appl. No. 15/148,920, dated Oct. 15, 2018, 5 pages.

"Pre-Interview First Office Action", U.S. Appl. No. 15/148,920, dated Aug. 28, 2018, 5 pages.

"Final Office Action", U.S. Appl. No. 15/148,920, dated Apr. 17, 2019, 31 pages.

Pekelis,"Statistics for the Internet Age: The Story Behind Optimizely's New Stats Engine", Jan. 20, 2015, 9 pages.

"Non-Final Office Action", U.S. Appl. No. 15/148,920, dated Sep. 27, 2019, 38 pages.

"Notice of Allowance", U.S. Appl. No. 15/148,920, Mar. 24, 2020, 13 pages.

"Notice of Allowability", U.S. Appl. No. 15/148,920, May 20, 2020, 3 pages.

Naghshvar,"Active Sequential Hypothesis Testing", Dec. 18, 2013, 38 pages.

Richardson,"Multiple Multistage Hypothesis Tests: A Sequential Detection Approach to Target Tracking", Jun. 1992, 177 pages.

Song,"Asymptotically optimal, sequential, multiple testing procedures with prior information on the number of signals", Jul. 20, 2016, 30 pages.

* cited by examiner

900

902
Form a plurality of samples from data describing user interactions with a plurality of items of digital content

904
Determine conversion rates for the plurality of items of digital content from the plurality of samples

906
Detect a gap between the determined conversion rates for the first and second items from the plurality of samples

908
Determine a number of user interactions of the data to be tested as part of sequential hypothesis testing in order to reach an amount of statistical significance, the number based at least in part on the established gap

910
Control output of an indication that is based on the number of user interactions in a user interface

*Fig. 9*

SAMPLE SIZE DETERMINATION IN SEQUENTIAL HYPOTHESIS TESTING

BACKGROUND

In digital medium environments, service providers strive to provide digital content that is of interest to users. An example of this is digital content used in a marketing context in order to increase a likelihood of conversion of the digital content. Examples of conversion include interaction of a user with the content (e.g., a "click-through"), purchase of a product or service that pertains to the digital content, and so forth. A user, for instance, may navigate through webpages of a website of a service provider. During this navigation, the user is exposed to an advertisement relating to the product or service. If the advertisement is of interest to the user, the user may select the advertisement to navigate to webpages that contain more information about the product or service that is a subject of the advertisement, functionality usable to purchase the product or service, and so forth. Each of these selections thus involves conversion of interaction of the user with respective digital content into other interactions with other digital content and/or even purchase of the product or service. Thus, configuration of the advertisements in a manner that is likely to be of interest to the users increases the likelihood of conversion of the users regarding the product or service.

In another example of digital content and conversion, users may agree to receive emails or other electronic messages relating to products or services provided by the service provider. The user, for instance, may opt-in to receive emails of marketing campaigns corresponding to a particular brand of product or service. Likewise, success in conversion of the users towards the product or service that is a subject of the emails directly depends on interaction of the users with the emails. Since this interaction is closely tied to a level of interest the user has with the emails, configuration of the emails also increases the likelihood of conversion of the users regarding the product or service.

Testing techniques have been developed in order to determine a likelihood of which items of digital content are of interest to users. An example of this is A/B testing in which different items of digital content are provided to different sets of users. An effect of the different items of the digital content on conversion by the different sets is then compared to determine a likelihood of which of the items has a greater likelihood of being of interest to users, e.g., resulting in conversion.

A/B testing involves comparison of two or more options, e.g., a baseline digital content option "A" and an alternative digital content option "B." In a marketing scenario, the two options include different digital marketing content such as advertisements having different offers, e.g., digital content option "A" may specify 20% off this weekend and digital content option "B" may specify buy one/get one free today.

Digital content options "A" and "B" are then provided to different sets of users, e.g., using advertisements on a webpage, emails, and so on. Testing may then be performed through use of a hypothesis. Hypothesis testing involves testing validity of a claim (i.e., a null hypothesis) that is made about a population in order to reject or prove the claim. For example, a null hypothesis "$H_0$" may be defined in which a conversion rate of the baseline is equal to a conversion rate of the alternative, i.e., "$H_0$:A=B". An alternative hypothesis "$H_1$" is also defined in which the conversion rate of the baseline is not equal to the conversion rate of the alternative, i.e., "$H_1$:A≠B."

Based on the response from these users, a determination is made whether to reject or not reject the null hypothesis. Rejection of the null hypothesis indicates that a difference has been observed between the options, i.e., the null hypothesis that both options are equal is wrong. This rejection takes into account accuracy guarantees that Type I and/or Type II errors are minimized within a defined level of confidence, e.g., to ninety-five percent confidence that these errors do not occur. A Type I error "$\alpha$" is the probability of rejecting the null hypothesis when it is in fact correct, i.e., a "false positive." A Type II error "$\beta$" is the probability of not rejecting the null hypothesis when it is in fact incorrect, i.e., a "false negative." From this, a determination is made as to which of the digital content options are the "winner" based on a statistic, e.g., a conversion rate.

A common form of A/B testing is referred to as fixed-horizon hypothesis testing. In fixed-horizon hypothesis testing, inputs are provided manually by a user which are then "run" over a defined number of samples (i.e., the "horizon") until the test is completed. These inputs include a confidence level that refers to a percentage of all possible samples that can be expected to include the true population parameter, e.g., "1−Type I error" which is equal to "1−$\alpha$". The inputs also include a power (i.e., statistical power) that defines a sensitivity in a hypothesis test that the test correctly rejects the null hypothesis, e.g., a false negative which may be defined "1−Type II error" which is equal to "1−$\beta$". The inputs further include a baseline conversion rate (e.g., "$\mu_A$") which is the statistic being tested in this example. A minimum detectable effect (MDE) is also entered as an input that defines a "lift" that can be detected with the specified power and defines a desirable degree of insensitivity as part of calculation of the confidence level. Lift is formally defined based on the baseline conversion rate as "$|\mu_B-\mu_A|/\mu_A$."

From these inputs, a horizon "N" is calculated that specifies a sample size per option (e.g., a number of visitors per digital content options "A" or "B") required to detect the specified lift of the MDE with the specified power. Based on this horizon "N", the number "N" samples are collected (e.g., visitors per offer) and the null hypothesis $H_0$ is rejected if "$\Lambda_N \geq \gamma$," where "$\Lambda_N$" is the statistic being tested at time "N" and "$\gamma$" is a decision boundary that is used to define the "winner" subject to the confidence level.

Fixed-horizon hypothesis testing has a number of drawbacks. In a first example drawback, a user that configures the test is forced to commit to a set amount of the minimum detectable effect before the test is run. Further, this commitment may not be changed as the test is run. However, if such a minimal detectable effect is overestimated, this test procedure is inaccurate in the sense that it possesses a significant risk of missing smaller improvements. If underestimated, this procedure is data-inefficient because a greater amount of time may be consumed to process additional samples in order to determine significance of the results.

In a second example drawback, fix-horizon hypothesis testing is required to run until the horizon "N" is met, e.g., a set number of samples is collected and tested. To do otherwise introduces errors, such as to violate a guarantee against Type I errors. For example, as the test is run, the results may fluctuate above and below a decision boundary that is used to reject a null hypothesis. Accordingly, a user that stops the test in response to these fluctuations before reaching the horizon "N" may violate a Type I error guarantee, e.g., a guarantee that at least a set amount of the calculated statistics do not include false positives.

SUMMARY

Sequential hypothesis testing techniques and systems are described in the following. Sequential hypothesis testing techniques involve testing sequences of increasingly larger number of samples until a winner is determined, as opposed to conventional techniques that are based on a fixed horizon of samples. In particular, sequential hypothesis testing techniques is based on whether a result of a statistic (e.g., conversion rate) has reached statistical significance that defines a confidence level in the accuracy of the results. Thus, statistical significance defines when it is safe to conclude the test, e.g., based on a level of confidence of a computed result (e.g., conversion) against defined amounts of Type I and Type II errors.

Sequential hypothesis testing also permits the user to "peek" into the test through use of a user interface (e.g., dashboard) to monitor the test in real time as it is being run, without affecting the accuracy of the test. Conventional fixed-horizon hypothesis testing does not support this ability as such a "peek" could alter accuracy of the results.

Real time output of this information in a user interface as a part of sequential hypothesis testing may be leveraged in a variety of ways. In a first example, a user may make changes as the test is run, e.g., to vary statistical significance described above. In another example, flexible execution is also made possible in that the test may continue to run even if initial accuracy guarantees have been met, such as to obtain higher levels of accuracy. Neither of these examples are possible in conventional fixed-horizon hypothesis testing because a test is required to run until the horizon is met.

The sequential hypothesis testing techniques described herein may also employ a sample size calculator that is configured to estimate an expected number of samples to be used to conclude a test in compliance with an accuracy guarantee. This may be performed before and during execution of the test, and thus may provide an output in real time as to when completion of the test may be expected. For example, the sample size calculator may be used before the test is run to determine an amount of time, number of samples, and so on that are likely to be involved in order to reach statistical significance. In another example, the sample size calculator is used while the test is run to indicate a number of samples, amount of time, and so forth that likely remains in order to complete the test, i.e., reach a desired amount of statistical significance. In this way, the sample size calculator may adapt to data being observed and provide a reliable estimate of a remaining number of samples to be processed in order to complete the test.

Sequential hypothesis testing techniques in a digital medium environment are described. In one or more implementations, sequential hypothesis testing is performed(?) sequential in nature and thus may be stopped as soon as a test is concluded. This permits a user to "peek" into the test as it is being run, which is not possible in conventional techniques. Further, performance of the test is also flexible in that a user may change values used to perform the test as it is run, which is also not possible in conventional techniques. A number of inputs provided by a user is also decreased over conventional examples, and thus may exhibit improved accuracy by avoiding conventional "best guess" user inputs. Other examples are also described, such as use of a false discover rate (FDR) as further described in the following.

Sample size determination techniques in sequential hypothesis testing in a digital medium environment are described. The sample size may be determined before a test to define a number of samples (e.g., user interactions with digital marketing content) that are likely to be tested as part of the sequential hypothesis testing in order to achieve a result. The sample size may also be determined in real time to define a number of samples that likely remain for testing in order to achieve a result. The sample size may be determined in a variety of ways, such as through simulation, based on a gap between conversion rates for different options being tested, and so on.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 9 is a flow diagram depicting a procedure in an example implementation in which a determination is made using a gap as to a number of user interactions that are likely to be tested as part of sequential hypothesis testing.

DETAILED DESCRIPTION

Overview

Figure 1:
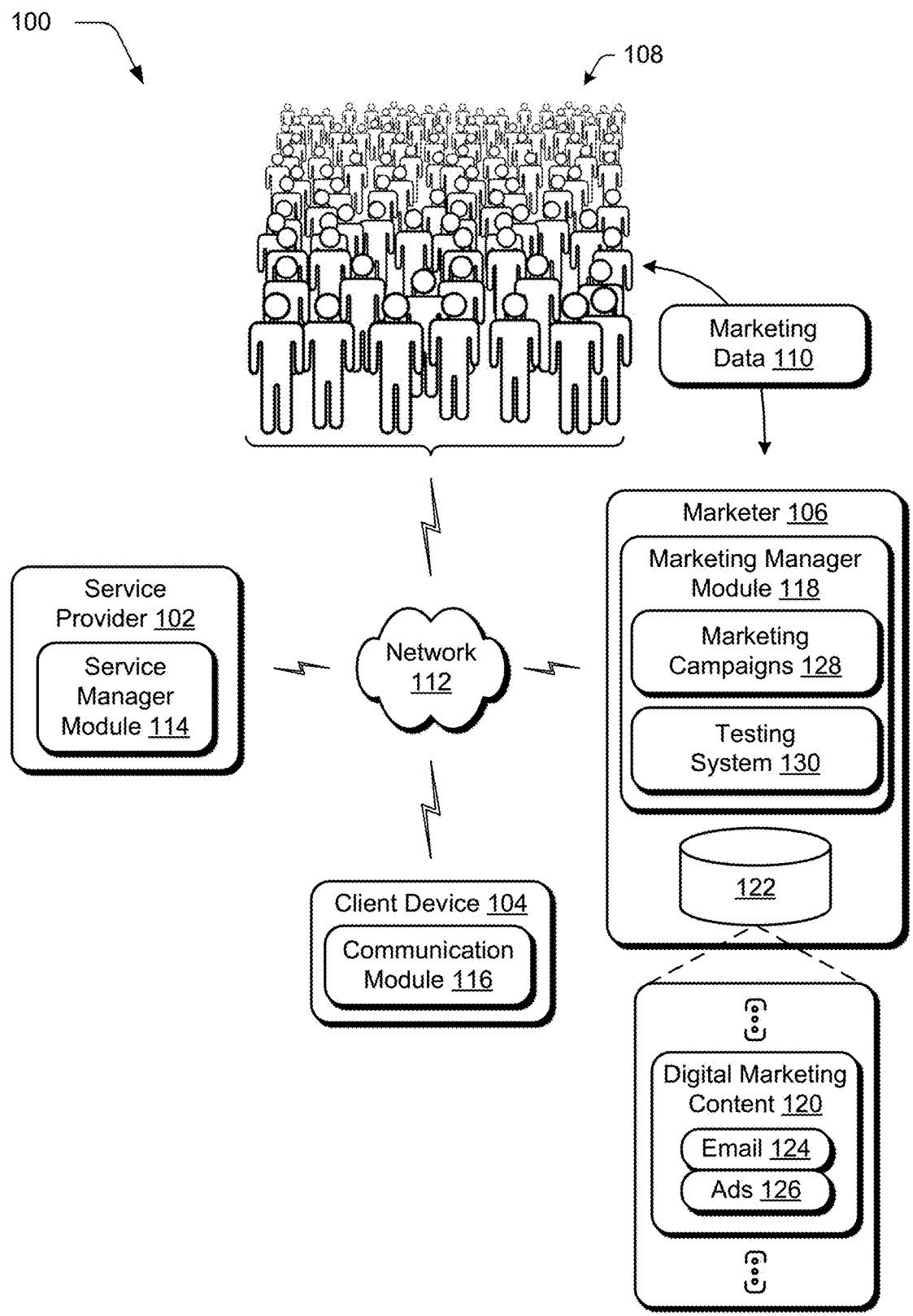
FIG. 1 is an illustration of an environment in an example implementation that is operable to employ sequential hypothesis testing techniques described herein.

Testing is used to compare different items of digital content against a current item of digital content to determine which item operates "best" as defined by a statistic. In a digital marketing scenario, this statistic includes a determination as to which item of digital content exhibits a greatest effect on conversion. Examples of conversion include interaction of a user with the content (e.g., a "click-through"), purchase of a product or service that pertains to the digital content, and so forth.

Conventional testing is performed using a fixed-horizon hypothesis testing technique in which input parameters are first set to define a horizon. The horizon defines a number of samples (e.g., users visiting a website that are exposed to the items of digital content) to be collected. The size of horizon is used to ensure that a sufficient number of samples are used to determine a "winner" within a confidence level of an error guarantee, e.g., to protect against false positives and false negatives. Examples of types of errors for which this guarantee may be applied include a Type I error (e.g., false positives) and a Type II error (e.g., false negatives) as previously described. As previously described, however, conventional fixed-horizon hypothesis testing techniques have a number of drawbacks including manual specification of a variety of input as a "best guess" that might not be well understood by a user and a requirement that the test is run until a horizon has been reached in order to attain accurate results, e.g., a set number of samples.

Sequential hypothesis testing techniques and systems are described in the following. In contrast to conventional techniques that are based on a fixed horizon of samples, the disclosed sequential hypothesis testing techniques involve testing sequences of increasingly larger number of samples until a winner is determined. In particular, the winner is determined based on whether a result of a statistic (e.g., conversion rate) has reached statistical significance that defines a confidence level in the accuracy of the results. Thus, statistical significance defines when it is safe to conclude the test, e.g., based on a level of confidence of a computed result (e.g., conversion) against defined amounts of Type I and Type II errors. This permits the sequential hypothesis testing technique to conclude as soon as statistical significance is reached and a "winner" declared, without forcing a user to wait until the horizon "N" of a number of samples is reached.

This also permits the user to "peek" into the test to monitor the test in real time as it is being run, without affecting the accuracy of the test. Such a "peek" capability is not possible using fixed-horizon hypothesis testing. Flexible execution is also made possible in that the test may continue to run even if initial accuracy guarantees have been met, such as to obtain higher levels of accuracy, and even permits users to change parameters used to perform the test in real time as the test is performed, e.g., the accuracy levels. This is not possible using conventional fixed-horizon hypothesis testing techniques in which the accuracy levels are not changeable during the test because completion of the test to the horizon number of samples is required.

Sequential hypothesis testing techniques may also be performed in a manner that reduces a number of manual inputs provided by the user. As such, this may limit "guesswork" required by the user as part of specifying parameters of the test to be performed and thus increase testing accuracy. As described above, for instance, conventional fixed-horizon hypothesis testing techniques require the user to input a Type I error, Type II error, conversion rate of a base hypothesis, and a minimum detectable effect (MDE). Manual specification of these inputs may be complicated to accurately define because these inputs are conventionally made as a "best guess" by a user, e.g., based on past user experience.

In the sequential hypothesis testing techniques described herein, however, the number of inputs defined by the user is reduced to specification of Type I and Type II errors, e.g., amounts of false positives and false negatives that are acceptable as part of the testing. In this way, efficiency of user interaction may be increased while reducing guesswork on the part of the user. Additionally, these inputs are changeable while the sequential test is being performed; thus, a user may also correct errors in specifying these inputs without being forced to start the test over from the beginning, which is the case in conventional fixed-horizon hypothesis testing techniques.

The sequential hypothesis testing techniques described herein may also employ a sample size calculator that is configured to estimate an expected number of samples to be used to conclude a test in compliance with an accuracy guarantee. This may be performed before and during execution of the test, and thus may provide an output in real time as to when completion of the test may be expected. In this way, the sample size calculator may adapt to data being observed and provide a reliable estimate of a remaining number of samples to be processed in order to complete the test.

For example, the sample size calculator may be used before a test to estimate an amount of time that is likely needed to completed the test. The sample size calculator may also be used during the test to estimate an amount of time remained. For example, a user interface (e.g., dashboard) may be out that describes a percentage of the testing that is completed, a remaining number of tests to be performed, an amount of time to test the remaining number of tests, and so on. Each of these values may be based, at least in part, on the expected number of samples calculated by the sample size calculator. The expected number of samples is calculated based Type I and Type II error margins as described above. In this way, a user may observe "what is happening" in real time and make adjustments as described. Conventional fixed-horizon hypothesis testing techniques, on the other hand, are not able to adapt to observed data as described above and thus may prove inefficient.

In another example, the sequential hypothesis testing techniques may be completed in a lesser amount of time than conventional fixed-horizon hypothesis testing techniques. To do so, a false discovery rate (FDR) may be employed instead of a conventional family-wised error rate (FWER) using Bonferroni correction. The FDR is defined as an average ratio of tests rejected by mistake to a total number of rejected tests. The false discovery rate is less conservative and has increased sample efficiency over FWER. FWER, for instance, may be considered statistically conservative and thus requires a greater number of samples (e.g., user interactions) in order to complete the test than FDR. Accordingly, FDR is not considered as conservative and thus does not require as many samples in order to complete the test.

The sequential hypothesis testing techniques may also improve ease of use. As previously described, hypothesis testing involves testing validity of a claim that is made about a population. In the null hypothesis described above, for instance, states that there is no difference in conversion rates between first and second items digital marketing content. Accordingly, if the null hypothesis is tested as false there is an observed difference in conversion rates. A p-value defines a strength of the evidence in performing the test, typically as a value between 0 and 1. For example, a small p-value indicates strong evidence against the null hypothesis, and thus is used to reject the null hypothesis. A large p-value, on the other hand, indicates weak evidence against the null hypothesis, and the null hypothesis is not rejected.

Multiple sequential hypotheses tests involve testing of more than two hypotheses, e.g., for "A," "B," "C", and so on items of digital marketing content. As part of the tests for the different hypotheses, the evidence "for" or "against" each hypothesis may vary in comparison for different respective thresholds, which is reflected by p-values as described above. For example, the rejection of a test does not involve the comparison of the statistical significance with a single threshold. Instead, the user is required to sort the p-values and compare the sorted values each with a different threshold to determine whether to reject a test. Accordingly, in these conventional techniques it could be confusing to the user in order to determine a relationship of the results of the different tests to each other. In the techniques described herein, however, the p-values are adjusted for comparison to a single threshold. In this way, the evidence "for" or "against" each hypothesis may be readily compared to other hypotheses and thus is readily understood by a user. A variety of other examples are also described in the following.

In the following discussion, digital content refers to content that is shareable and storable digitally and thus may include a variety of types of content, such as documents, images, webpages, media, audio files, video files, and so on. Digital marketing content refers to digital content provided to users related to marketing activities performed, such as to increase awareness of and conversion of products or services made available by a service provider, e.g., via a website. Accordingly, digital marketing content may take a variety of forms, such as emails, advertisements included in webpages, webpages themselves, and so forth.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ sequential testing techniques described herein. The illustrated environment 100 includes a service provider 102, client device 104, marketer 106, and source 108 of marketing data 110 that are communicatively coupled, one to another, via a network 112. Although digital marketing content is described in the following, testing may be performed for a variety of other types to digital content, e.g., songs, articles, videos, and so forth, to determine "which is better" in relation to a variety of considerations.

Computing devices that are usable to implement the service provider 102, client device 104, marketer 106, and source 108 may be configured in a variety of ways. A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 11.

The service provider 102 is illustrated as including a service manager module 114 that is representative of functionality to provide services accessible via a network 112 that are usable to make products or services available to consumers. The service manager module 114, for instance, may expose a website or other functionality that is accessible via the network 112 by a communication module 116 of the client device 104. The communication module 116, for instance, may be configured as a browser, network-enabled application, and so on that obtains data from the service provider 102 via the network 112. This data is employed by the communication module 116 to enable a user of the client device 104 to communicate with the service provider 102 to obtain information about the products or services as well as purchase the products or services.

In order to promote the products or services, the service provider 102 may employ a marketer 106. Although functionality of the marketer 106 is illustrated as separate from the service provider 102, this functionality may also be incorporated as part of the service provider 102, further divided among other entities, and so forth. The marketer 106 includes a marketing manager module 118 that is implemented at least partially in hardware to provide digital marketing content 120 for consumption by users, which is illustrated as stored in storage 122, in an attempt to convert products or services of the service provider 102.

The digital marketing content 120 may assume a variety of forms, such as email 124, advertisements 126, and so forth. The digital marketing content 120, for instance, may be provided as part of a marketing campaign 128 to the sources 108 of the marketing data 110. The marketing data 110 may then be generated based on the provision of the digital marketing content 120 to describe which users received which items of digital marketing content 120 (e.g., from particular marketing campaigns) as well as characteristics of the users. From this marketing data 110, the marketing manager module 118 may control which items of digital marketing content 120 are provided to a subsequent user, e.g., a user of client device 104, in order to increase a likelihood that the digital marketing content 120 is of interest to the subsequent user.

Part of the functionality usable to control provision of the digital marketing content 120 is represented as a testing system 130. The testing system 130 is representative of functionality implemented at least partially in hardware (e.g., a computing device) to test an effect of the digital marketing content 120 on a metric, e.g., on conversion of products or services of the service provider 102. The testing system 130, for instance, may estimate a resulting impact of items of digital marketing content 120 on conversion of products or services of the service provider 102, e.g., as part of A/B testing. A variety of techniques may be used by the testing system 130 in order to perform this estimation, an example of which is described in the following and shown in a corresponding figure.

Figure 2:
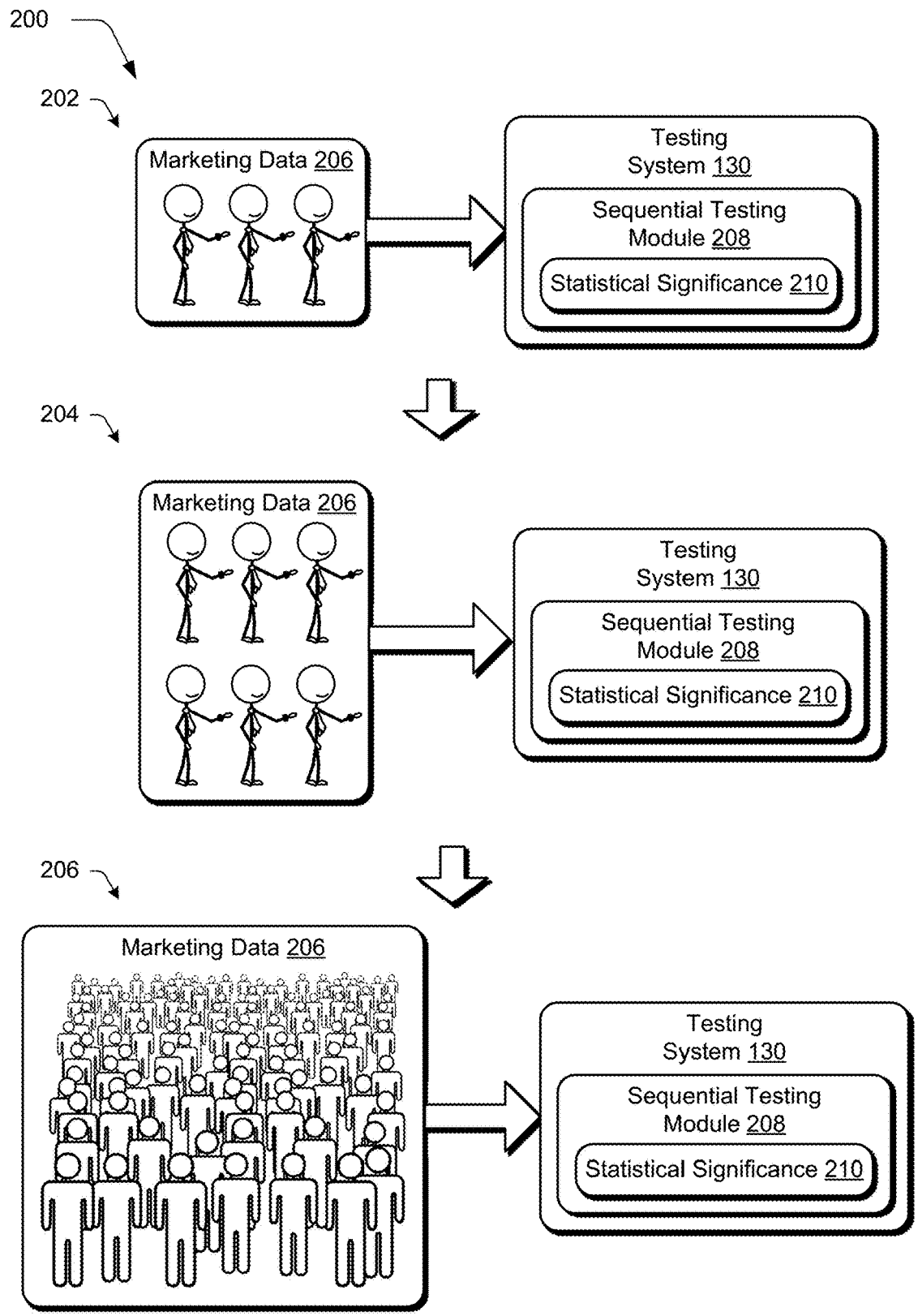
FIG. 2 depicts a system in an example implementation in which a testing system of FIG. 1 is configured to perform sequential hypothesis testing.

FIG. 2 depicts a system 200 in an example implementation in which the testing system 130 of FIG. 1 is configured to perform sequential hypothesis testing. The system 200 is illustrated using first, second, and third stages 202, 204, 206. The testing system 130 in this example includes a sequential testing module 208. The sequential testing module 208 is implemented at least partially in hardware to perform sequential hypothesis testing to determine an effect of different options on a statistic, e.g., conversion rate. Continuing with the previous example, the sequential testing module 208 may collect marketing data 206 which describes interaction of a plurality of users with digital marketing content 120. From this, an effect is determined of different items of digital marketing content 120 (e.g., items "A" and "B") on conversion of a product or service being offered by the service provider 102. Although two options are described in this example, sequential hypothesis testing may be performed for more than two options as described in the corresponding section below.

To perform sequential hypothesis testing, the sequential testing module 208 evaluates the marketing data 206 as it is received, e.g., in real time, to determine an effect of digital marketing content 120 on conversion. Statistical significance 210 is used to define a point at which is it considered "safe" to consider the test completed. That is, a "safe" point of completion is safe with respect to an an amount of false positives or false negatives permitted. This is performed in sequential hypothesis testing without setting the horizon "N" beforehand, which is required under the conventional fixed-horizon hypothesis testing. Thus, a result may be achieved faster and without requiring a user to provide inputs to determine this horizon.

The "sequence" referred to in sequential testing refers to a sequence of samples (e.g., the marketing data 206) that are collected and evaluated to determine whether statistical significance 210 has been reached. At the first stage 202, for instance, the sequential testing module 208 may collect marketing data 206 describing interaction of users with items "A" and "B" of the digital marketing content 120. The sequential testing module 208 then evaluates this marketing data 206 to compare groups of the users that have received item "A" with a group of the users that have received item "B," e.g., to determine a conversion rate exhibited by the different items. Statistical significance 210 is also computed to determine whether it is "safe to stop the test" at this point, e.g., in order to reject the null hypothesis.

For example, a null hypothesis "$H_0$" is defined in which a conversion rate of the baseline is equal to a conversion rate of the alternative, i.e., "$H_0:A=B$". An alternative hypothesis "$H_1$" is also defined in which the conversion rate of the baseline is not equal to the conversion rate of the alternative, i.e., "$H_1:A \neq B$." Based on the response from these users described in the marketing data 206, a determination is made whether to reject or not reject the null hypothesis. Whether it is safe to make this determination is based on statistical significance 210, which takes into account accuracy guarantees regarding Type I and Type II errors, e.g., to ninety-five percent confidence that these errors do not occur.

A Type I error "$\alpha$" is the probability of rejecting the null hypothesis when it is in fact correct, i.e., a false positive. A Type II error "$\beta$" is the probability of not rejecting the null hypothesis when it is in fact incorrect, i.e., a false negative. If the null hypothesis is rejected (i.e., a conversion rate of the baseline is equal to a conversion rate of the alternative) and is statistically significant (e.g., safe to stop), the sequential testing module 208 may cease operation as further described in greater detail below. Other examples are also described in the following in which operation continues as desired by a user, e.g., to achieve results with increased accuracy and thus promote flexible operation.

Figure 3:
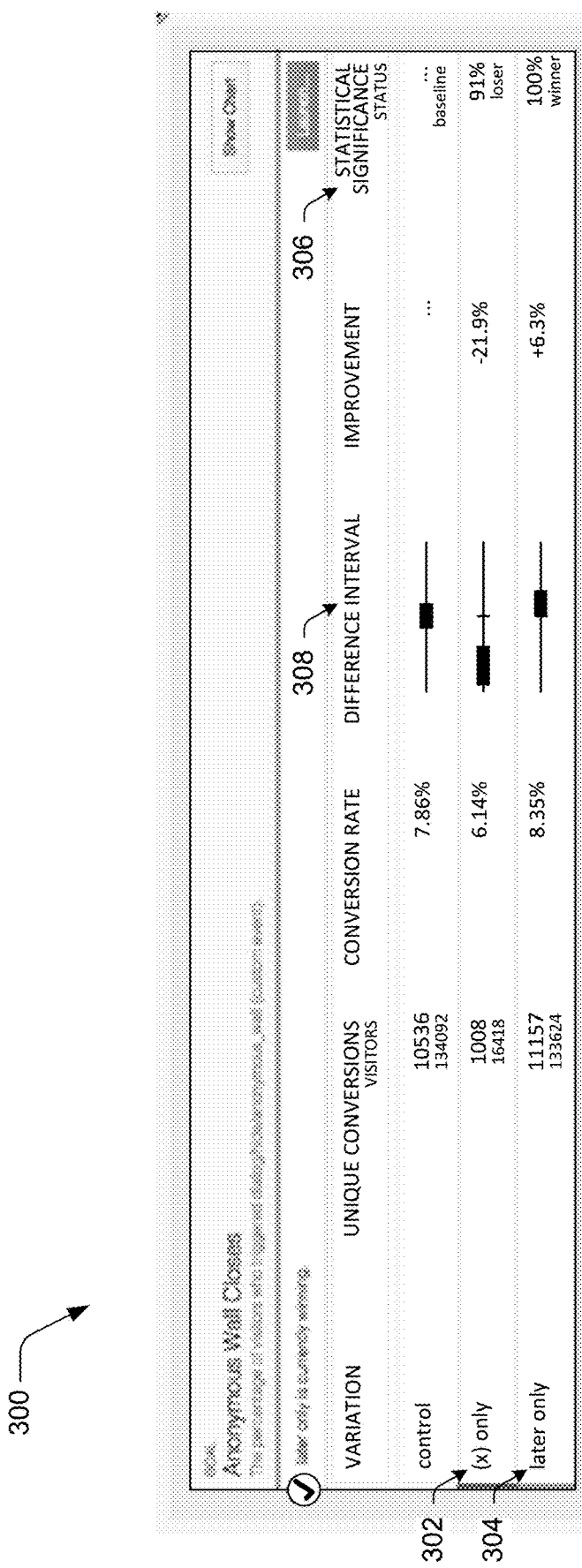
FIGS. 3 and 4 depict example user interfaces including results of testing performed by a sequential testing module of FIG. 2.
Figure 4:
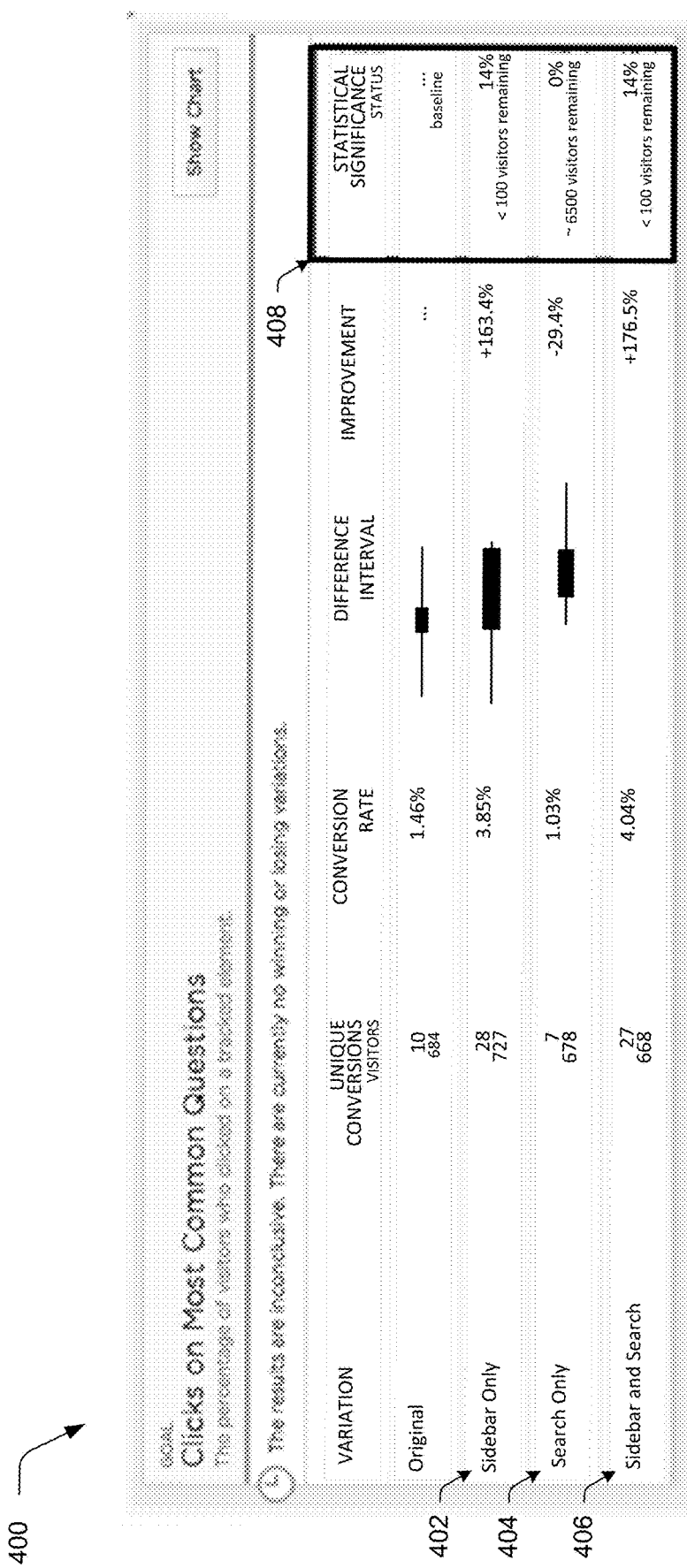

If the null hypothesis is not rejected (i.e., a conversion rate of the baseline is equal to a conversion rate of the alternative and/or it is not safe to stop), the sequential testing module 208 then collects additional marketing data 206 that describes interaction of additional users with items "A" and "B" of the digital marketing content 120. For example, the marketing data 206 collected at the second stage 204 may include marketing data 206 previously collected at the first stage 202 and thus expand a sample size, e.g., a number of users described in the data. This additional data may then be evaluated along with the previously collected data by the sequential testing module 208 to determine if statistical significance 210 has been reached. If so, an indication may be output that it is "safe to stop" the test, e.g., as part of a user interface as shown in FIGS. 3 and 4. Testing may also continue as previously described or cease automatically.

If not, the testing continues as shown for the third stage 206 in which an even greater sample size is collected for addition to the previous samples. In this way, once statistically significant results have been obtained, the process may stop without waiting to reach of predefined horizon "N" as required in conventional fixed-horizon hypothesis testing. This acts to conserve computational resources and results in greater efficiency, e.g., an outcome is determined in a lesser amount of time. Greater efficiency, for instance, may refer to an ability to fully deploy the winning option (e.g., the item of digital marketing content exhibiting the greatest conversion rate) at an earlier point in time. This increases a rate of conversion and reduces opportunity cost incurred as part of testing. For example, a losing option "a" may be replaced by the winning option "B" faster and thus promote an increase in the conversion rate sooner than by waiting to reach the horizon.

Mathematically, the sequential testing module 208 accepts as inputs a confidence level (e.g., "1−Type I" error which is equal to "$1-\alpha$") and a power (e.g., "1−Type II error" which is equal to "$1-\beta$"). The sequential testing module 208 then outputs results of a statistic "$\Lambda_n$" (e.g., a conversion rate) and a decision boundary "$\gamma_n$" at each time "n." The sequential testing module 208 may thus continue to collect samples (e.g., of the marketing data 206), and rejects the null hypothesis $H_0$ as soon as "$\Lambda_n \geq \gamma_n$," i.e., the results of the statistic are statistically significant 210. Thus, in this example the testing may stop once statistical significance 210 is reached. Other examples are also contemplated, in which the testing may continue as desired by a user, e.g., to increase an amount of an accuracy guarantee as described above. Results of the sequential testing may be provided to a user in a variety of ways to monitor the test during and after performance of the test, examples of which are described in the following section.

Sequential Testing User Interface

FIGS. 3 and 4 depict example user interfaces 300, 400 including results of testing performed by the sequential testing module 208 of FIG. 2. The user interfaces 300, 400 are configured to provide information to a user while the test is running and even after it has stopped. For example, the user interface 300 of FIG. 3 depicts results of first and second tests 302, 304 that have concluded. The results of the first test 302 show that the base option A is "better" than the alternative option B, i.e., exhibits an increase in a statistic being tested for the different options. The results of the second test 304 show the opposite in which alternative option C exhibits better performance than the base option A. In the user interface 400 of FIG. 4, testing results for first, second, and third tests 402, 404, 406 are displayed in real time as the tests are run.

A variety of different types of information may be output via the user interfaces 300, 400. In a first example involving statistical significance 308, 408, the user interfaces 300, 400 include information detailing an amount of testing remaining in order to achieve a specified level of confidence against Type I or Type II errors. This is performed through use of a sample size determination module 602 as shown in further described in relation to FIG. 6. The sample size determination module 602 is implemented at least partially in hardware to determine a number of samples 604 that are likely to be required in order to be determined as "statistically significant" as defined as an amount of permissible Type I and Type II errors.

The determined number of samples 604 is then compared with a number of samples that have been tested by the testing system 130 in order to define a percentage of samples that have been tested in order to reach statistical significance 306. As illustrated for the first test 302, for instance, the statistical significance 306 status has reached "91%" and thus is close to completion of the test. The second test 304 has completed as indicated by a "100%" value for statistical significance 306 and thus this test may conclude, may continue to achieve higher levels of protection against Type I and Type II errors, and so on. A variety of other indications may also be output, such as a likely "time to complete" or "time remaining" based on current traffic flow of a website. In this way, the user interface 300 may give insight to a user in real time as the test is run, which is not possible in conventional fixed horizon hypothesis testing techniques.

As previously described, a user viewing the user interfaces 300, 400 may also employ the value of the statistical significance as a "soft stop" as opposed to the hard stop of the decision boundary of fixed horizon hypothesis testing. A soft stop, for instance, may be used to allow the user to change a desired Type I error in real time as the test is run. In this way, the test may continue even after the test statistic reaches statistical significance as indicated in the user interfaces 300, 400 without starting over. This has numerous advantages. For example, a user that is unsure about a desired level of Type I error may make a change as the test progresses through the testing sequence. In addition to use as a soft stop, statistical significance also informs the user "how far away" the test is from being considered conclusive. Accordingly, the user may use statistical significance to determine whether it is safe to stop the test (e.g., as soon as statistical significance reaches "%(1−α)"), where "α" is the desired Type I error (1−α) is the desired significance level) as described above. Further discussion of computation of statistical significance 306, 408 for output in the user interfaces 300, 400 is further described beginning in relation to FIG. 6.

In a second example, the user interface 300 of FIG. 3 also outputs an indication of a difference interval 308. The difference interval 308 is computed by the testing system 1300 to define a difference between the options being tested. For example, this may indicate "how much better" the winning variation is than the losing variation with high probability when testing digital marketing content options. The difference interval 308 in the illustrated example is reported by the testing system 130 as a high probability interval for a gap. The gap is defined as a difference between actual conversions of digital marketing content options "A" and "B," e.g., a (1−α) of a high probability interval for "$\theta = \mu_B - \mu_A$" where "θ" is the gap.

Figure 7:
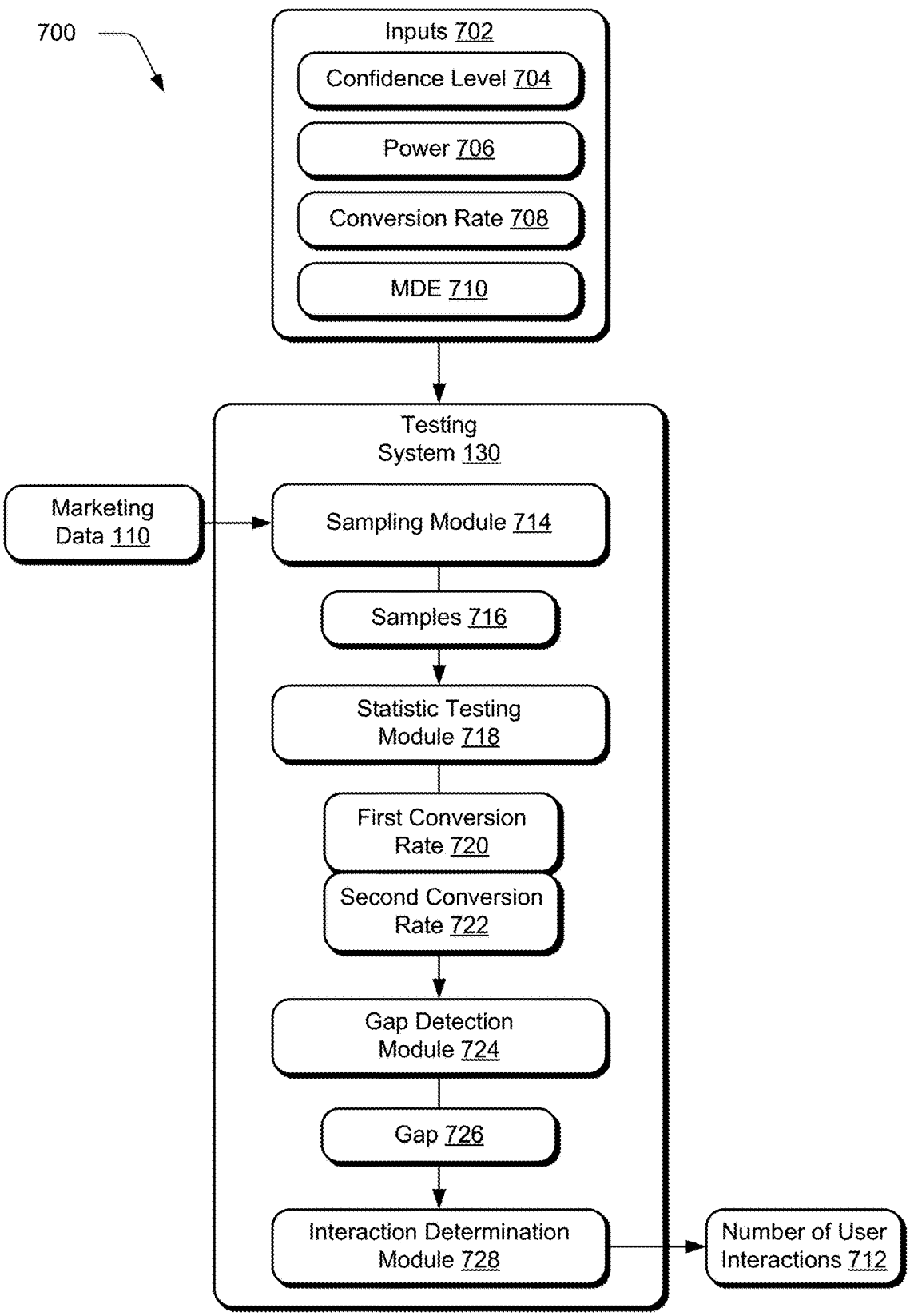
FIG. 7 depicts an embodiment of a testing system of FIG. 1 as configured to determine a sample size for sequential hypothesis testing based on a gap between conversion rates.

As illustrated in FIG. 7, for instance, a gap detection module 724 is employed to detect a gap 726 between first and second conversion rates 720, 722 for first and second items of digital marketing content, e.g., a base option and an alternative option. The first and second conversion rates 720, 722, for instance, may be expressed as intervals and the gap 726 is calculated by taking a mean of the intervals for these options for comparison.

In the illustrated examples of FIG. 3, the difference interval 308 for the first test 302 shows that the base option exhibits far better performance than the alternative. In the second test 304, the alternative option is only slightly (but statistically significant) better than the base option. Since there are more observations (i.e., samples) in the second test 304 than the first test 302 (e.g., 133,624 vs. 16,418 visitors), the difference interval 308 of the second test 304 is smaller than the different interval 308 of the first test 302.

Other examples are also contemplated, such as to employ the difference interval 308 in the calculation of the statistical significance 306, 408 for output in the user interfaces 300, 400 as further described in relation to FIG. 7.Other user interface configurations are also contemplated. For example, the user interface may be adapted to address sequential hypothesis testing that includes multiple alternatives. An example of such a user interface and information displayed within such a user interface is described in a corresponding section below.

Sequential Multiple Hypothesis Testing

Figure 5:
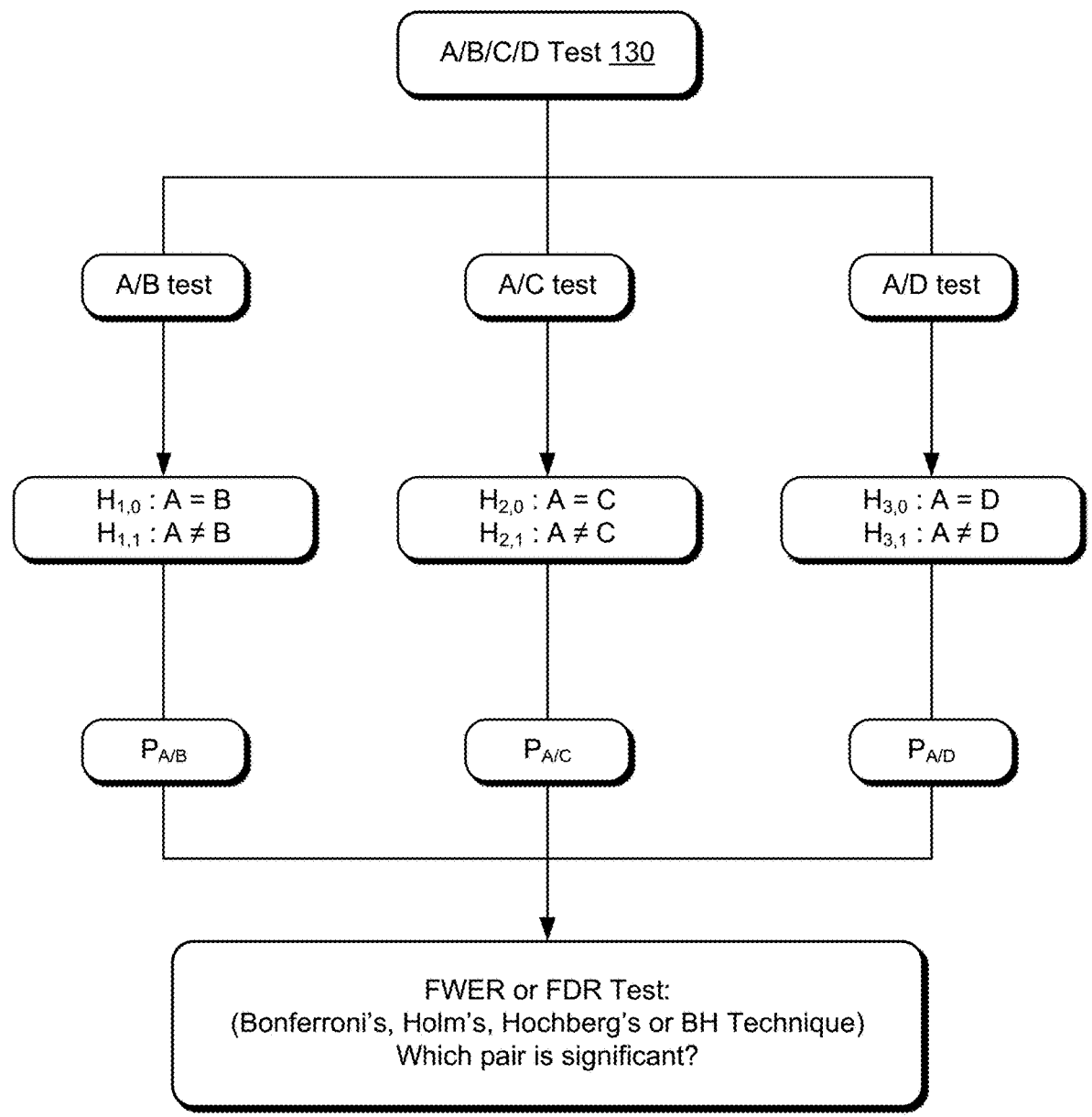
FIG. 5 depicts a system in an example implementation to perform sequential hypothesis testing for more than two options.

FIG. 5 depicts a system 500 in an example implementation to perform sequential hypothesis testing for more than two options. Testing may also be performed for multiple alternatives (e.g., "B," "C," "D," and so on) against a base option, e.g., "A." This results in multiple tests of the form (A, B), (A, C), (A, D), and so forth. However, this presents a challenge in how to assign a desired Type I error and Power to each of these tests. In the following, techniques are described to expand multiple hypothesis testing techniques for use as part of sequential hypothesis testing. In this way, these multiple hypothesis testing techniques may gain advantages of sequential hypothesis testing. For example, the tests may dynamically reach a soft stop once statistical significance is reached, a sample size calculation is not required in advance, and so on as described above.

In the conventional approaches for A/B testing, Type I error is typically controlled to be under a pre-specified level "α." This may be extended to multiple hypothesis testing through use of a family-wise error rate (FWER) or a false discovery rate (FDR). The below table depicts different scenarios in multiple hypothesis testing.

|  | accepted | rejected | total |
|---|---|---|---|
| $H_0$ true | U | V | $m_0$ |
| $H_0$ false | T | S | $m - m_0$ |
| total | m − R | R | m |

In the above table, "m" is the total number of tested hypotheses, "$m_0$" is the number of true null hypotheses, "$m-m_0$" is the number of true alternative hypotheses, "V" is the number of false discoveries, "S" is the number of true discoveries, "T" is the number of false non-discoveries, "U" is the number of true non-discoveries, and finally "R" is the total number of rejected null hypotheses (also called "discoveries"). Note that "R" is an observable random variable, while "S," "T," "U," and "V" are unobservable random variables.

A family-wise error rate (FWER) is defined as the probability of making at least one false rejection, i.e., $$\text{FWER} = \mathbb{P}(V \geq 1).$$

FWER is considered, in practice, to represent a conservative notion of error in multiple hypothesis testing. Another notion of error that is considered less conservative is a false discovery rate (FDR) and is defined as the expected proportion of false rejections among all rejections, which may be expressed as follows:

$$FDR = \mathbb{E}\left[\frac{V}{\max(R, 1)}\right].$$

FDR is equivalent to the FWER when all hypotheses are true, but smaller otherwise. Therefore, techniques using FDR are typically weaker in terms of false discovery, but are more efficient to perform. In practice, the choice of whether to use FWER or FDR depends on the nature of the problem. If a user wants to minimize the risk of false rejections or the number of hypotheses is small, then FWER is appropriate. However, if there is a certain level of tolerable false rejections or the number of tests is large, then use of FDR is appropriate as FWER can be overly stringent.

In conventional fixed-horizon multiple hypothesis testing, the FWER approach is used to calculate the horizon "N", e.g., using a Bonferroni technique. To do so, an A/B fixed-horizon calculator is used with Type I error set equal to "α/m" to obtain the number of samples for each variation, in which "α" defines an amount of the FWER (i.e., family wise error rate) that is to be permitted and "m" is a number of tests. For example, if the fixed-horizon calculator returns "N", the total number of samples obtained to complete the test is "N*(m+1)," because there exists "m" alternatives and one base option. After setting the horizon in a conventional fixed-horizon multiple hypothesis test, the test is run until this horizon is reached and then a p-value is computed for each test.

A p-value is used to define statistical significance of the testing results. As previously described hypothesis testing involves testing validity of a claim that is made about a population, i.e., the null hypothesis described above. The alternative hypothesis is valid if the null hypothesis is concluded to be untrue. The testing is performed using the data (e.g., the marketing data 206) and corresponding statistics, e.g., the conversion rate.

The statistical significance of the p-value is generally defined using a number between 0 and 1 and used to determine a strength of the evidence in testing the hypothesis, i.e., a level of confidence in the result. For example, a small p-value indicates strong evidence against the null hypothesis and thus is used to reject the null hypothesis. A large p-value, on the other hand, indicates weak evidence against the null hypothesis, a result of which is that the null hypothesis is not rejected.

To incorporate these techniques as part of sequential hypothesis testing, a sequential p-value is set for each test "j" and is defined in a way that at each time "n," a guarantee may be made that:

$\mathbb{P}$ ($H_{j,0}$ is rejected by time $n|H_{j,0}$ is true)$\leq p_j(n)$.

This is a value that can be derived from an average likelihood ratio statistic. If the statistic is a martingale (e.g., is a 50/50 model of a fair game such as a bet on red or black in roulette) under the null hypothesis with the mean value 1, then the sequential p-value is defined as follows:

$$p_j(n) = \frac{1}{\max_{i \leq n} \Lambda_j(n)}, j \in J = \{1, \ldots, m\},$$

where "m" is the total number of the tests, "J" is the set of all "m" tests, and "$\Lambda_{(n)}$" is a gap-based statistic. As previously described, the gap is defined as a difference between actual conversions of "A" and "B," e.g., a "(1−α)" of a high probability interval for "$\theta = \mu_B - \mu_A$." Note that this sequential p-value is non-increasing, a property that proves consistency of the sequential multiple hypothesis testing techniques described herein.

A correction term may also be applied. The correction term is applied to provide a correlation between tests. This correlation is either intrinsic or is a result of stopping a test because of the p-value of some other test. For example, the p-value may be multiplied by a correction term c(m)= $\Sigma_{j=1}^{m} 1/j$, which results in the following sequential p-value:

$$p_j(n) = \frac{c(m)}{\max_{i \leq n} \Lambda_j(n)} = \frac{\sum_{j=1}^{m} 1/j}{\max_{i \leq n} \Lambda_j(n)}, j \in J = \{1, \ldots, m\}.$$

Now that examples of a sequential p-values have been defined for each test, rejection strategies for adaptation of FWER and FDR to the sequential setting. To describe these rejection procedures, the p-values of the "m" tests at time step "n" are denoted by $p_{(1)}(n), \ldots, p_{(m)}(n)$ and the sorted p-values in ascending order of the "m" tests at time step "n" (i.e., $p_{(1)}(n) \leq \ldots \leq p_{(m)}(n)$ are denoted by "$p_{(1)}(n), \ldots, p_{(m)}(n)$." In an implementation, the test is frozen and samples are no longer collected for that particular test when a test is rejected. Additionally, when a test is rejected at time "n," the test is rejected for each of the future time steps (e.g., subsequent sample) because the sequential p-values are defined as non-increasing. In one scenario, this functionality may also be relaxed in order to give additional control to the user by permitting the test to continue to run. In that scenario, a test is not stopped when its null hypothesis is rejected and collection and processing of samples continues. Additionally, a user may be informed through a statistic on a dashboard that it is now safe to consider this particular test concluded as shown and described in relation to FIGS. 3 and 4.

The following describes use of a variety of different types of rejection strategies that are modified for use as part of sequential hypothesis testing, e.g., in order to reject the null hypothesis. Examples of the rejection strategies in the following and referenced in FIG. 5 include Bonferroni, Holm, Hochberg, and Benjamini-Hochberg (BH). The first three techniques control FWER at level "α" and the last one controls FDR at level "α."

In a modified Bonferroni technique, at each time step "n," all the tests "j∈J" are rejected that satisfy the following expression:

$$p_j(n) \leq \frac{\alpha}{m}.$$

In this technique, the p-values are not sorted at each time step in the sequence.

In a modified Holm technique, at each time step "n," tests "{1, . . . , j*−1}," are rejected where "j*" is the smallest index such that:

$$p_{(j)}(n) \geq \frac{\alpha}{m - j + 1}.$$

Here this technique starts from the smallest p-value, which corresponds to the largest statistics "Λ(n)," checks whether the p-value satisfies the above equation, and stops as soon as the above equation is satisfied for a test "j*." In response to satisfaction of the equation, all the tests "$\{1, \ldots, j^*-1\}$" are rejected, i.e., the null hypothesis for these test is rejected. Holm is called a step-down technique because this technique starts from the largest statistic (smallest p-value) and proceeds downward through increasingly lesser values. This technique may also be expressed as follows:

Step 1: If $$p_{(1)}(n) < \frac{\alpha}{m},$$

reject $H_{(1),0}$ and go to next step, otherwise, accept $H_{(1),0}, \ldots, H_{(m),0}$ and stop;

Step j: If $$p_{(j)}(n) < \frac{\alpha}{m-j+1},$$

reject $H_{(j),0}$ and go to Step j+1, otherwise, accept $H_{(j),0}, \ldots, H_{(m),0}$ and stop; and Step m: If $p_{(m)}(n)<\alpha$, reject $H_{(m),0}$, otherwise, accept $H_{(m),0}$.

In a modified Hochberg technique, at each time step "n," tests "$\{1, \ldots, j^*\}$," are rejected where "j*" is the largest index such that:

$$p_{(j)}(n) \leq \frac{\alpha}{m-j+1}.$$

This technique starts from the largest p-value, which corresponds to the smallest statistics "$\Lambda(n)$," checks whether it satisfies the above equation, and stops as soon as the p-value for test "j*" satisfies the equation. In response, all tests "$\{1, \ldots, j^*\}$" are rejected. Hochberg is referred to as a step-up procedure because the smallest statistic (largest p-value) is the starting point and the technique proceeds from there.

Step 1: If $p(m)(n)<\alpha$, reject $H_{(1),0}, \ldots, H_{(m),0}$ and stop, otherwise, accept $H_{(m),0}$ and go to next step.

Step m−j+1: If $$p_{(j)}(n) < \frac{\alpha}{m-j+1},$$

reject $H_{(1),0}, \ldots, H_{(m),0}$ and stop, otherwise, accept $H_{(j),0}$ and go to Step m−j+2; and Step m: If $$p_{(1)}(n) < \frac{\alpha}{m},$$

reject $H_{(1),0}$, otherwise, accept $H_{(1),0}$.

In a modified Benjamini-Hochberg (BH) technique, at each time step "n," tests "$\{1, \ldots, j^*\}$" are rejected where "j*" is the largest index such that:

$$p_{(j)}(n) \leq \frac{j\alpha}{m}.$$

Similar to Hochberg, this technique starts from the largest p-value, which corresponds to the smallest statistic "$\Lambda(n)$," checks whether it satisfies the above expression, and stops as soon as it does for a test "j*." All the tests "$\{1, \ldots, j^*\}$" are rejected in response. BH is called a step-up technique because it starts by rejecting the tests with larger sequential p-values and proceeds to reject tests with decreasingly smaller sequential p-values.

Thus, in this section modifications are described to incorporate rejection strategies as part of sequential hypothesis testing. The next section describes examples of user interfaces that are configured to provide information related to sequential multiple hypothesis testing.

User Interface for Sequential Multiple Hypothesis Testing and Statistical Significance A challenge with the Benjamini-Hochberg (BH) technique for sequential FDR described above is that it is not user-friendly and visual. For example, the rejection of a test does not involve the comparison of the statistical significance with a single threshold. Instead, the user is required to sort the p-values and compare the sorted values each with a different threshold to determine whether to reject a test. This challenge, however, may be mitigated through the use of BH adjusted p-values (e.g., to adjust the determined statistical significance) as described in the following such that the user may readily compare the p-values to a single threshold to determine a level of confidence in the results.

A BH adjusted p-value of a test having a sorted index (i) is defined as follows:

$$p_{(i)}^{BH} = \min\left(\min_{j \geq i} \frac{m \cdot p_{(j)}}{j}, 1\right).$$

From this, the following is proved:

$p_{r_n(i)}^{BH} \leq \alpha \Leftrightarrow$ Test i is rejected at level $\alpha$ at time step n, The function "$r_n$" takes in the original index of a test and returns its sorted index at time step "n." Furthermore, if all the original p-values are decreasing, then all the adjusted BH p-values are also decreasing.

As a result of the above two properties, the BH-adjusted p-values $(1-p_{r_n(i)}^{BH})$ may be displayed in a user interface as the statistical significance for multiple hypothesis testing. This gives the user the option to soft-stop, i.e., continue running the test even if the statistical significance has crossed the pre-set threshold, i.e., decision boundary.

An example of pseudo-code for the multiple hypothesis testing user interface follows:

```
for n − 1, 2, . . . do
    Compute p-values p_j using the expression for correction as described
      above, for j = 1, 2, . . . , m
    Sort the p-values to obtain p_(1)(n) ≤ p_(2)(n) ≤ . . . ≤ p_(m)(n)
    //r_n is the function that returns the sorted index of a test given its
      original index
    For i = 1, . . . , m do
      Compute adjusted p-value as follows:

p_(i)^BH (n) = min     m·p_(j)(n)
                      j≥i     ─────────
                                  j end for
    Report statistical significance for test i as follows:
        p_{r_n(i)}^{BH} (n)
end for
```

Thus, the user interface may also display information particular to testing of multiple hypotheses in order to increase user awareness as to values of the testing as it is run or after performance of the test is completed as previously described.

Difference Intervals for Multiple Hypothesis Testing

The difference intervals for each test can be constructed in a manner similar to that described above. For example, to construct "$(1-\alpha)$" difference intervals, there is a "$1-\alpha$" probability of the difference interval containing the true parameter. Intuitively, since the tests are independent, "$1-\alpha$" of these confidence intervals will contain their true parameter on average in a random subset of these tests.

However, this property may not be true if the subset is not random but instead rather includes only those tests which are selected using the BH-procedure. In order to maintain a false-coverage rate "$\alpha$" among the selected tests, the confidence intervals constructed are set as $$"1 - \frac{R}{m}\alpha"$$

instead of "$1-\alpha$" where "R" is the number of selected tests.

Let "R(t)" represent the number of tests rejected at time "t" and "m" represent the total number of tests. The confidence intervals may be calculated as follows:

(a) For tests that have been declared significant, the $$\left(1 - \frac{R(t)\alpha}{m}\right)\text{-confidence intervals}$$

confidence intervals are computed.

(b) For tests that are not significant, the $$\left(1 - \frac{(R+1)\alpha}{m}\right)\text{-confidence intervals}$$

confidence intervals are computed.

The confidence levels for the non-significant tests are set as above because when the $(R+1)^{th}$ test turns from non-statistically significant to statistically significant, (a) the confidence intervals of the previously statistically significant tests change from level $$\left(1 - \frac{R\alpha}{m}\right) \text{ to } \left(1 - \frac{(R+1)\alpha}{m}\right),$$

(b) the confidence level for the test that turned from non-statistically significant to statistically significant stays at $$\left(1 - \frac{(R+1)\alpha}{m}\right),$$

and (c) while the confidence level for the tests that are non-statistically significant changes from $$\left(1 - \frac{(R+1)\alpha}{m}\right) \text{ to } \left(1 - \frac{(R+2)\alpha}{m}\right).$$

Thus, the change in the confidence intervals is not abrupt, creating a good user-experience.

The construction of the confidence intervals in this way supports a variety of advantages. The first advantage guarantees that the false coverage rate for the selected tests is "$\leq \alpha$" at any stopping time "T." The second advantage is consistency results akin to A/B tests—the confidence interval does not contain 0 if and only if the BH-adjusted significance level is above $1-\alpha$. In an implementation, the difference interval is unchanged (e.g., frozen) if the BH-adjusted p-value does not change. The difference interval is changed in this implementation solely when the BH-adjusted p-value decreases. This ensures consistency since a test once rejected is not reintroduced.

Sample Size Calculator

In the following, a sample size calculator is described that is configured to output a number of samples that are likely to be involved to reach statistical significance, e.g., to guarantee amounts of Type I and Type II errors. In a digital marketing content scenario, for instance, this may give an estimate of how many visitors to a website are involved in provided desired type I error and power (e.g., Type II error) guarantees. This in turn gives an estimate of an amount of time the test is to be run, e.g., based also on observed traffic to the website, an amount of emails sent with a defined amount of time, and so forth. The sample size calculator may also give an indication of when the test is inconclusive (i.e., is not statistically significant) and declare equality without violating a power guarantee, e.g., against Type II errors.

A variety of techniques may be used by the sample size calculator to determine the number of samples. In a first such example in the following, a Monte Carlo simulation technique is employed to compute a horizon when a result of the statistic (e.g., conversion rate) first reaches statistical significance (e.g., crosses a decision boundary) under an alternative hypothesis. In a second such example in the following, an approximate solution is proposed that exploits asymptotic Gaussianity of a gap-based technique for sequential hypothesis testing. While the result returned by this second example is more conservative, the underlying technique is numerically tractable and may be implemented in real time, e.g., to support use online as part of a web service.

Accordingly, in the following the first example is described. This is followed by a description of a gap-based technique to give context to usage of the gap as part of the second example. Sections then follow that describe the second example as well as a multiple hypothesis example.

Sample Size Calculator and Simulations for A/B Sequential Hypothesis Testing

Figure 6:
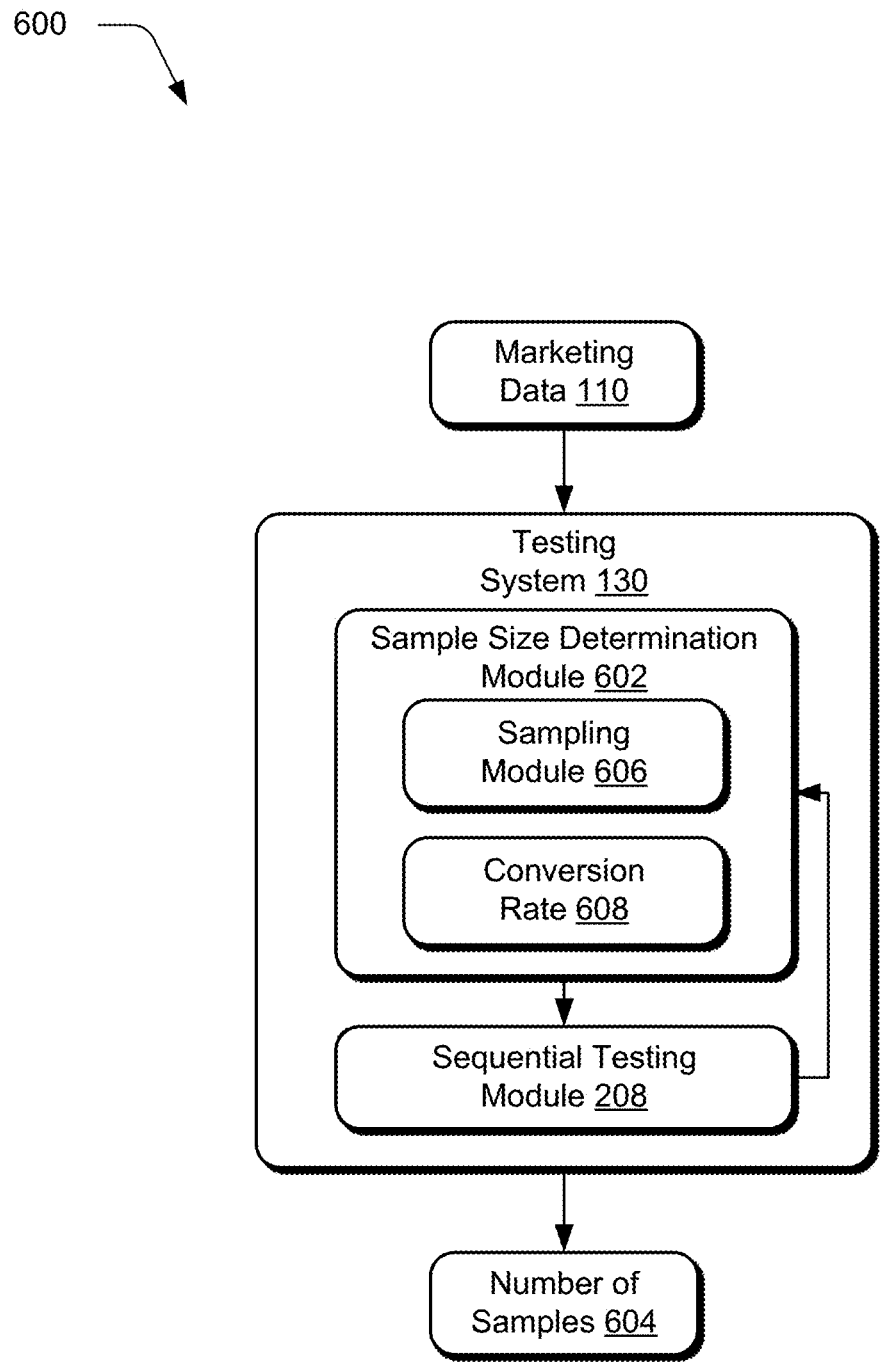
FIG. 6 depicts a system in an example implementation having a sample size determination module to calculate output a number of samples that are likely to be involved to reach statistical significance based on simulations.

FIG. 6 depict a system 600 in an example implementation having a sample size determination module 602 implemented as a module at least partially in hardware to calculate output a number of samples 604 that are likely to be involved to reach statistical significance based on simulations. As previously described statistical significance defines when it is safe to conclude the test, e.g., an accuracy guarantee regarding defined amounts of Type I and Type II errors. The number of samples 604, for instance, may be combined with knowledge of an amount of time that is likely to obtain the samples to estimate an amount of time that will be consumed to complete the test, i.e., a time remaining. This information may then be output as indications in a user interface, such as to inform a user as to a likelihood of how long it will take to perform the test before the test is begun, how many more samples are to be tested in order for the test to be considered conclusive, and so forth.

In this example, the testing system 130 is configured to perform simulations to estimate the number of samples 604 that are likely to be tested in order to reach a safe conclusion based on the defined amounts of errors. In a Monte Carlo technique, samples are formed by the sampling module 606 from data to be tested, e.g., marketing data 110 in this example that describes user interactions with the options being tested. A plurality of these samples are then used to simulate testing in order to arrive at the estimate of the number of samples 604 that are likely to be consumed as part of the test.

For example, a sample from the sampling module 606 and a conversion rate 608 are provided to the sequential testing module 208. The conversion rate 608 may be fixed to a current empirical value "$\hat{\mu}$" and the sampling module 606 may select samples using a Bernoulli technique using this probability. In a Bernoulli technique, each element of a population that is sampled is subjected to an independent Bernoulli trial. The Bernoulli trial is used to determine whether the elements are included as part of the sample during the drawing of a single sample. A property of Bernoulli sampling is that each of the elements (e.g., user interactions) of the population (e.g., the marketing data 110) have an equal probability of being included in the sample during the drawing of the single sample by the sampling module 606.

The sample from the sampling module 606 and the conversion rate 608 are then provided to the sequential testing module 208. The sequential testing module 208 tests this sample using sequential hypothesis testing. From this testing, the sampling module 606 detects a number of the samples that are tested in order to achieve a desired amount of statistical significance, e.g., cross a decision threshold that is defined based on an amount of Type I and/or Type II error. This testing is repeated for a plurality of samples, and the detected numbers of samples for each iteration are stored. From this, the sample size determination module 602 determines a number of samples 604 that are likely to be tested in order to achieve conclusiveness from the marketing data 110 as a whole, e.g., as an average from the stored and detected number of samples.

Accordingly, the sequential hypothesis test is performed using this sampled data as if this was the observed data. Although this technique is accurate, it is also computationally intensive. For example, even a single estimation of the number of samples 604 may involve thousands of simulations. This computational expense may be reduced by running the simulations not at every time step, but at defined intervals (e.g., 100 time steps). In the following, an approximation technique is described that is based on a gap between conversion rates that exhibits increased computational efficiency.

Gap-based Technique for Sequential Hypothesis Testing

A gap in the following is defined as a difference between actual conversions of options "A" and "B," e.g., a $(1-\alpha)$ expressed as a high probability interval for "$\theta=\mu_B-\mu_A$" where "$\theta$" is the gap. The gap, therefore, is also usable to define when to reject the null hypothesis. For example, if an interval defined by the gap does not include zero, then the null hypothesis cannot be true because there is a defined difference between the options. A high probability interval between 0.5 and 3.5 for the gap, for instance, indicates that each of the differences defined by the interval between the actual conversions are different to at least some degree. Thus, the null hypothesis for the options that correspond to this interval may be rejected. On the other hand, inclusion of zero within the interval defined by the gap indicates a possibility that the null hypothesis could indeed be true and thus is not rejected. In this way, the gap may also be employed to determine a number of samples (e.g., user interactions) at which it is safe to consider the test conclusive as further described in the following section.

Mathematically, let $$"\hat{\mu}_A(n) = \frac{1}{n}\sum_{i=1}^{n} x_i" \text{ and } "\hat{\mu}_B(n) = \frac{1}{n}\sum_{i=1}^{n} y_i"$$

represent the empirical mean (i.e., conversion rate) of options "A" and "B" after observing "n" visitors per option. The empirical gap may thus be defined as "$\hat{\theta}_n = \hat{\mu}_B(n) - \hat{\mu}_A(n)$." When "n" is large, "$\mathcal{N}(\mu_A, \text{Var}(A)/n)$" and "$\mathcal{N}(\mu_B, \text{Var}(B)/n)$" are usable to approximate "$\hat{\mu}_A(n)$" and "$\hat{\mu}_B(n)$," respectively. Thus, "$\mathcal{N}(\theta=\mu_B-\mu_A, V)$," with "$V=(\text{Var}(A)+\text{Var}(B))/n$" is a reasonable approximation for "$\hat{\theta}_n$."

Thus, two simple hypotheses "$H_0:\theta=0$" and "$H_1:\theta=\theta_1$," with "$\hat{\theta}_n$" considered as a sufficient statistic, then the likelihood ratio may be expressed as follows:

$$\Lambda_n = \frac{L_n(H_1)}{L_n(H_0)} = \frac{Pr(\mathcal{D}|H_1)}{Pr(\mathcal{D}|H_0)} = \frac{Pr(\hat{\theta}_n|H_1)}{Pr(\hat{\theta}_n|H_0)} = \frac{\mathcal{N}(\theta_1, V)}{\mathcal{N}(0, V)}.$$

This likelihood ratio is a martingale under the null hypothesis. However, in A/B testing, the null hypothesis is "$H_0:\theta=0$," which is a simple hypothesis, and the alternative hypothesis is "$H_1:\theta\neq 0$," which is a composite hypothesis. One way to address the observation that the alternative hypothesis is not simple is to use the average likelihood ratio, i.e., $$\Lambda_n = \frac{Pr(\mathcal{D}|H_1)}{Pr(\mathcal{D}|H_0)} = \frac{\int Pr(\theta, V|H_1) Pr(\mathcal{D}|\theta, V, H_1) d\theta dV}{Pr(\mathcal{D}|H_0)}.$$

This is similar to what occurs in a Bayes factor scenario when "$(\theta, V)$" are considered the parameters of the alternative model $H_1$. Note that the above quantity is not the Bayes factor, however, but because the parameters of the base hypothesis are marginalized out in the denominator, this quantity is a martingale under the null hypothesis.

Because calculation of an integral over both "$\theta$" and "$V$" is complicated, the gap-based techniques described herein are configured to consider "$V$" fixed and replaced with its empirical value as follows:

$$V_n = \frac{\hat{\mu}_A(n)(1-\hat{\mu}_A(n)) + \hat{\mu}_B(n)(1-\hat{\mu}_B(n))}{n}.$$

Under this assumption, the average likelihood ratio is written as follows:

$$\Lambda_n = \frac{Pr(\mathcal{D}|H_1)}{Pr(\mathcal{D}|H_0)} = \frac{\int Pr(\theta|H_1)Pr(\mathcal{D}|\theta, V_n, H_1)d\theta}{Pr(\mathcal{D}|H_0)}.$$

This technique then places a Gaussian prior over "θ," i.e., $\theta \sim \mathcal{N}(0, \tau)$, which gives the following:

$$\Lambda_n(\tau) = \frac{\int Pr(\theta|H_1)Pr(\mathcal{D}|\theta, V_n, H_1)d\theta}{Pr(\mathcal{D}|H_0)} = \frac{\int \mathcal{N}(0, \tau)\mathcal{N}(\theta, V_n)d\theta}{\mathcal{N}(0, V_n)},$$

which may then be expressed as follows:

$$\Lambda_n(\tau) = \frac{1}{\sqrt{2\pi\tau}}\exp\left(\frac{\hat{\theta}_n^2}{2V_n}\right)\int \exp\left(-\frac{(\hat{\theta}_n - \theta)^2}{2V_n}\right)\exp\left(-\frac{\theta^2}{2\tau}\right)d\theta,$$

and finally as this:

$$\Lambda_n(\tau) = \sqrt{\frac{V_n}{V_n + \tau}}\exp\left(\frac{\tau\hat{\theta}_n^2}{2V_n(V_n + \tau)}\right).$$

Since it is ignored in the above that "V" is not known and is replaced with an empirical value, "Vn," the statistic "Λn(τ)" is not a martingale. However, the gap-based technique assumes that it is a positive martingale under the null hypothesis, and thus, "$P_0(\Lambda_n(\tau) \geq b) \leq 1/b$". Therefore, the following stopping rule:

stop as soon as $\Lambda_n(\tau) \geq 1/\alpha$         Stopping Rule:

indicates Type I error control at level α.

Because "$\Lambda_n(\tau)$" is approximately martingale under the null hypothesis, the Type I error guarantee of this technique is also approximated, i.e., is true only for a particular range of the free parameter "τ." Also, the value "τ" of this technique is a free parameter for which a value is to be found (e.g., from the historical and synthetic data) such that this value satisfies the required Type I error and Power guarantees. Further, this type of (average) likelihood ratio based techniques are asymptotically Power 1, but the free parameter is to be selected such that for a reasonable MDE, the Power of the technique is bigger than or equal to "1−β."

A stopping rule of this technique can be expressed as follows:

$$(i)\ \sqrt{\frac{V_n}{V_n + \tau}}\exp\left(\frac{\tau\hat{\theta}_n^2}{2V_n(V_n + \tau)}\right) \geq \frac{1}{\alpha},$$

$$(ii)\ \frac{1}{2}\log\frac{V_n}{V_n + \tau} + \frac{\tau\hat{\theta}_n^2}{2V_n(V_n + \tau)} \geq \log\frac{1}{\alpha},$$

$$(iii)\ |\hat{\theta}_n| \geq \sqrt{\left(2\log\frac{1}{\alpha} - \log\frac{V_n}{V_n + \tau}\right)\left(\frac{V_n(V_n + \tau)}{\tau}\right)}.$$

Sample Size Determination for Sequential Hypothesis Testing

FIG. 7 depicts an embodiment 700 of the testing system 130 of FIG. 1 as configured to determine a sample size for sequential hypothesis testing based on a gap between conversion rates. The testing system 130 this example is similar to a fixed-horizon calculator in that similar inputs 702 are received. These inputs include a confidence level 704 (defined as "1−Type I error=1−α"), a power 706 (defined as "1−Type II error=1−β"), a baseline conversion rate 708 "$\mu_A$," and minimum detectable effect (MDE) 710. The MDE 710 as previously described is the lift that can be detected with the specified Power (i.e., the desirable degree of insensitivity.

A number of samples is output (e.g., a horizon "N") as a sample size that is likely involved in order for the testing system 130 to reach statistical significance as part of sequential hypothesis testing. In the illustrated example, this is a number of user interactions 712 per option required to detect the specified lift (i.e., MDE 712) with the specified power 706. The number of user interactions 712 may then be used with information describing traffic of a website, emails sent, and so on to estimate an amount of time the test it to be run. Moreover, this output may be used to inform a user as to when a test may be stopped "safely" for tests that reach statistical significance but are not sufficient to reject the null hypothesis. For example, a test may be performed for a relatively long period of time and reach a confidence level against Type I and Type II errors but does not reach at least a MDE 710 sufficient to reject the null hypothesis. In such an instance, a user may conclude that once the number of interactions 712 has been reached it is safe to conclude that the null hypothesis will not be rejected.

In this example, the testing system 130 first employs a sampling module 712 implemented at least partially in hardware to form samples 716 from marketing data 110. A variety of sampling techniques may be employed, such as Bernoulli sampling as described above.

A statistic testing module 718 is then employed to process the samples. The statistic testing module 718 is implemented at least partially in hardware to calculate a result of a statistic for the samples 716, such as a first and second conversion rates 720, 722 for first and second items of digital content being tested.

A gap detection module 724 is then employed to detect a gap 726 between the first and second conversion rates 720, 722 in this example. The first and second conversion rates 720, 722, for instance, may be expressed as intervals and the gap 726 is calculated by taking a mean of the intervals for comparison.

The gap 726 is then input to an interaction determination module 728 to compute a number of user interactions 712, at which, a sequential hypothesis test is to be considered conclusive, i.e., has reached statistical significance. As described above, the gap 726 is defined as a difference between actual conversions of options "A" and "B," e.g., a (1−α)) expressed as a high probability interval for "$\theta = \mu B - \mu_A$" where "θ" is the gap. The gap 726, therefore, is also usable to define when to reject the null hypothesis and from this a number of user interactions 712 likely to be processed in order to reject the null hypothesis. For example, if an interval defined by the gap 726 does not include zero, then the null hypothesis cannot be true because there is a defined difference between the options. A high probability interval between 0.5 and 3.5 for the gap, for instance, indicates that each of the differences defined by the interval between the actual conversions are different to at least some degree.

Thus, the null hypothesis for the options that correspond to this interval may be rejected. On the other hand, inclusion of zero within the interval defined by the gap indicates a possibility that the null hypothesis could indeed be true and thus is not rejected. In this way, the gap 726 may also be employed to determine a number of samples (e.g., user interactions) at which it is safe to consider the test conclusive.

Example mathematics behind the determination of sample size by the testing system 130 for sequential hypothesis testing are now described. Let "$T\alpha = \text{infn}\{|\hat{\theta}_n| \geq \Gamma n\}$," where "$\hat{\theta}_n$" is the sample random variable of gap, and "$\Gamma n$" is the decision boundary for the empirical gap in the gap-based technique described in equation (iii) above. The output of the sequential sample-size calculator is the smallest "N" such that:

$$\mathbb{P}_{(T_\alpha \leq N|H_1)} \geq 1-\beta,$$

where the alternative hypothesis "$H_1$" is defined as "$H_1 = \{|\theta| \geq \xi\}$," in which "$\xi = \mu_A \times \text{MDE}$" is the worst case alternative hypothesis, i.e., the smallest difference between the means of A and B that is to be detected.

For any fixed value of N>0, consider the following chain of inequalities:

$$\mathbb{P}(T_\alpha \leq N \mid H_1) =$$

$$\mathbb{P}\left(\min_{1 \leq n \leq N} |\hat{\theta}_n| \geq \Gamma_n\right) = \mathbb{P}\left(\bigcup_{i=1}^{N} |\hat{\theta}_i| \geq \Gamma_i\right) \geq \max_i \mathbb{P}(|\hat{\theta}_i| \geq \Gamma_i) = \mathbb{P}(|\hat{\theta}_N| \geq \Gamma_N).$$

In this approximate solution, the rightmost component of the above inequality "$\mathbb{P}(|\hat{\theta}_N| \geq \Gamma N)$" is used. Since "$\hat{\theta}_N$" is the empirical gap between the mean of two Bernoulli distributions, the empirical gap has mean "$\xi$" and variance "V/N" under "$H_1$," where "$V = \text{Var}(A) + \text{Var}(B) = \mu_A(1-\mu_A) + \mu_B(1-\mu_B)$." Moreover, when "N" is sufficiently large (e.g., N>30), by central limit theorem, "$\hat{\theta}_n$" may be assumed to be a Gaussian random variable. Given the above information, the following expression is true:

$$\mathbb{P}(|\hat{\theta}_N| \geq \Gamma_N) = \mathbb{P}\left(\frac{\hat{\theta}_N - \xi}{V/N} \geq \frac{\Gamma_N - \xi}{V/N}\right) = 1 - \Phi\left(\frac{\Gamma_N - \xi}{V/N}\right),$$

where "$\Phi$" is a normalized Gaussian Cumulative Distribution Function (CDF) error function. In the above, "$\Gamma_N$" is the decision boundary described in equation (iii) above with "VN" replaced by "V/N," the true variance of the empirical gap "$\hat{\theta}_N$." Finally, by setting "$\mathbb{P}(|\hat{\theta}_N| \geq \Gamma_N) = 1-\beta$," the (approximate) sequential sample-size "NUB" (i.e., the number of samples 604) is calculated as the solution of:

$$(V/N)\Phi^{-1}(\beta) = (\Gamma_N - \xi).$$

By the above approximations, "NUB" is always an upper-bound to an exact sample size "N*". The above equation may be solved by numerical optimization algorithms, such as through use of a bi-section method.

In sequential hypothesis testing, the output of the sample size determination module 602 is informative and not part of the test. This is unlike a fixed-horizon test for which the output of the calculator is an important part of the test without which the test is meaningless because the output defines a point at which to conclude the test. Here "N*" is specified as an upper-bound on a sample size required to achieve specified power and type I error guarantees. In real-world applications, the sample size required to conclude an A/B test (if A is not equal to B) is often significantly smaller than N*. In order to have sufficient Power and Type I error guarantees at the same time to allow peeking in hypothesis testing, the value of "N*" is often larger than the sample-size of the fixed-horizon test.

Multiple Hypothesis Sample Size Calculator

This technique is an extension of the sample size calculator for A/B tests described above. For multiple hypothesis testing using the Benjamini-Hochberg technique, the sample size determination module may be implemented slightly different. This is because a test could be rejected not only when its significance value is above the threshold but also when another test crosses its decision threshold as described above.

Hence, the p-values are first sorted in ascending order to calculate the running time. For test (j), a quantity is computed by substituting for $$\text{``}\frac{j\alpha}{m}\text{''}$$

for "$\alpha$" in the previously described equation. This is not the estimated run time for test (j). The estimated running time, rather, is the minimum of all the running times for tests (i)≥(j). Mathematically, estimated running time for test (j) is expressed as follows:

$$n'_{(j)} = \min_{(i) \geq (j)} \min_{n \geq n_0} \left\{ \sqrt{\frac{W_{n,i}}{W_{n,i} + \tau}} \exp\left(\frac{\tau \hat{\theta}^2_{n_0,i}}{2W_{n,i}(W_{n,i} + \tau)}\right) > \frac{m}{i\alpha} \right\}$$

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

Figure 8:
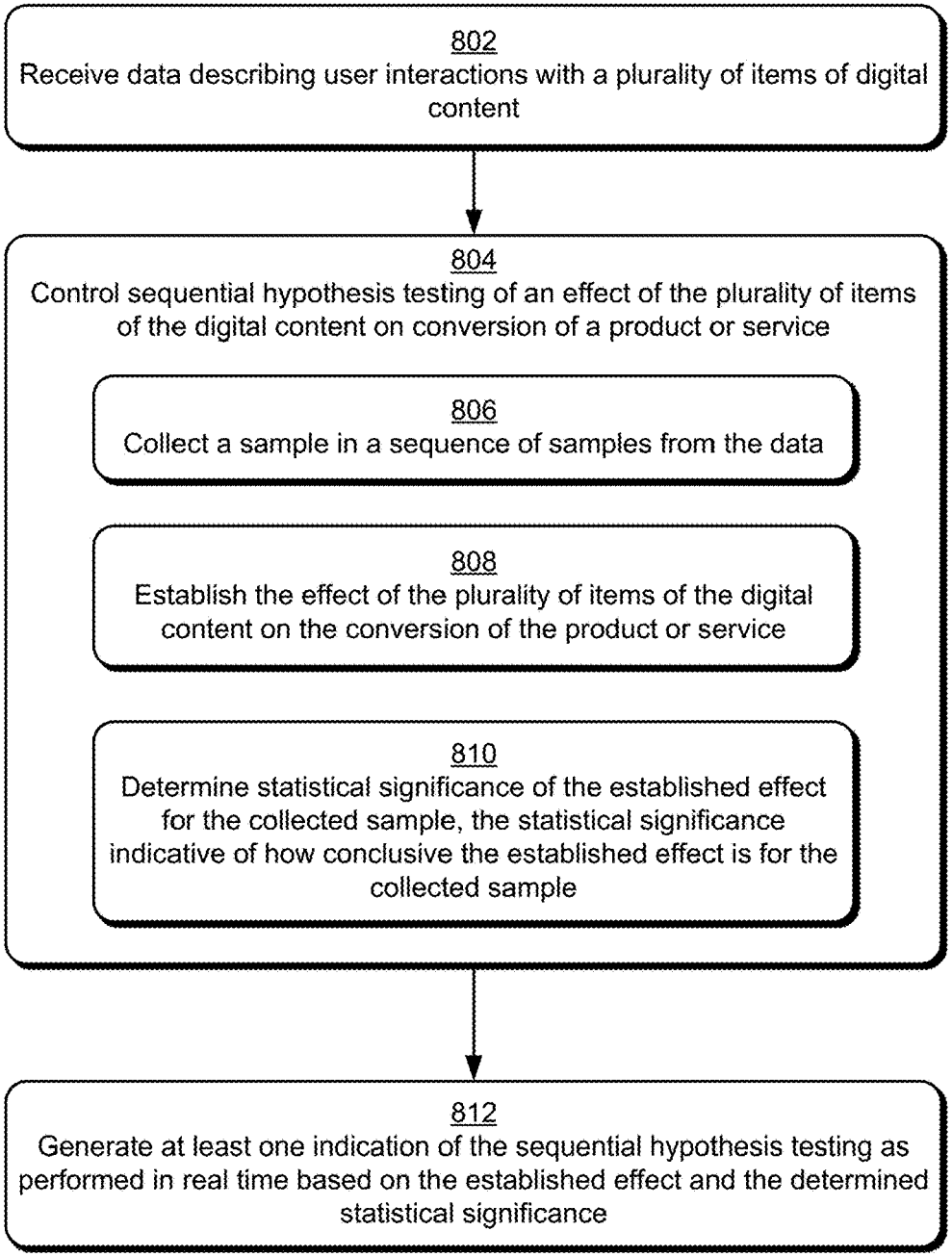
FIG. 8 is a flow diagram depicting a procedure in an example implementation in which real time output of an indication is controlled as part of sequential hypothesis testing.

FIG. 8 depicts a procedure 800 in an example implementation in which real time output of an indication is controlled as part of sequential hypothesis testing. Data is received describing user interactions with a plurality of items of digital content (block 802). As shown in FIG. 2, for instance, marketing data 206 is received by a testing system 130 that describes user interactions with items of digital marketing content 120, such as emails 124, advertisements 126, and so forth.

Sequential hypothesis testing is controlled of an effect of the plurality of items of the digital content on conversion of a product or service (block 804). Sequential hypothesis testing, for instance, may be used to determine which of the items of digital marketing content 120 exhibit better performance through use of a conversion rate.

The control of the sequential hypothesis testing includes collecting a sample in a sequence of samples from the data (block 806). The sample, for instance, may be collected in real time as users visit a website. An effect is established of the plurality of items of the digital content on the conversion of the product or service (block 808). A statistic of "conversion rate" in this instance is calculated for the plurality of items that describes conversion (e.g., interaction such as a "click through", purchase of a product or service) resulting from the user interactions.

Statistical significance is determined of the established effect for the collected sample, the statistical significance indicative of how conclusive the established effect is for the collected sample (block 810). Statistical significance indicates when it is "safe" to consider results of the test conclusive. This is defined in relation to an accuracy guarantee specified using Type I and/or Type II errors.

At least one indication is generated of the sequential hypothesis testing as performed in real time based on the established effect and the determined statistical significance (block 812). The indication, for instance, may output a statistical significance value itself, an indication that it is "safe to stop" the test, employ a "hard stop," and so forth as described above. In this way, the previous advantages of sequential hypothesis testing may be realized, such as efficient determination of a winner, flexible performance, resource efficient, and so forth.

FIG. 9 depicts a procedure 900 in an example implementation in which a determination is made using a gap as to a number of user interactions that are likely to be tested as part of sequential hypothesis testing. A plurality of samples is formed from data describing user interactions with a plurality of items of digital content (block 902). The samples, for instance, may be formed by a sampling module 714 using a variety of different sampling techniques, such as Bernoulli sampling.

Conversion rates are determined for the plurality of items of digital content from the plurality of samples (block 904). A statistic testing module 718, for instance, may determine first and second conversion rates 720, 722 for first and second options being, tested, e.g., first and second items of digital content.

A gap is detected between the determined conversion rates for the plurality of items from the plurality of samples (block 906). The gap is defined as a difference between conversion rates for the different options, e.g., two or more options. A number of user interactions is determined of the data to be tested as part of sequential hypothesis testing in order to reach an amount of statistical significance, the number based at least in part on the established gap (block 908). As previously described, the gap 726 may be used to indicate a stopping point at which the test is considered conclusive. From this stopping point, a number of user interactions 712 used to "get there" may be determined.

Output is controlled of an indication that is based on the determined number of user interactions in a user interface (block 910). The indication may be configured in a variety of ways. The indication, for instance, may indicate the number of user interactions 712 that are likely to be tested in order to achieve a point at which it is safe to conclude the test. The indication may also indicate an amount of time that it will take to perform the test. This indication may also specify the gap itself in real time. Other examples are also contemplated.

Figure 10:
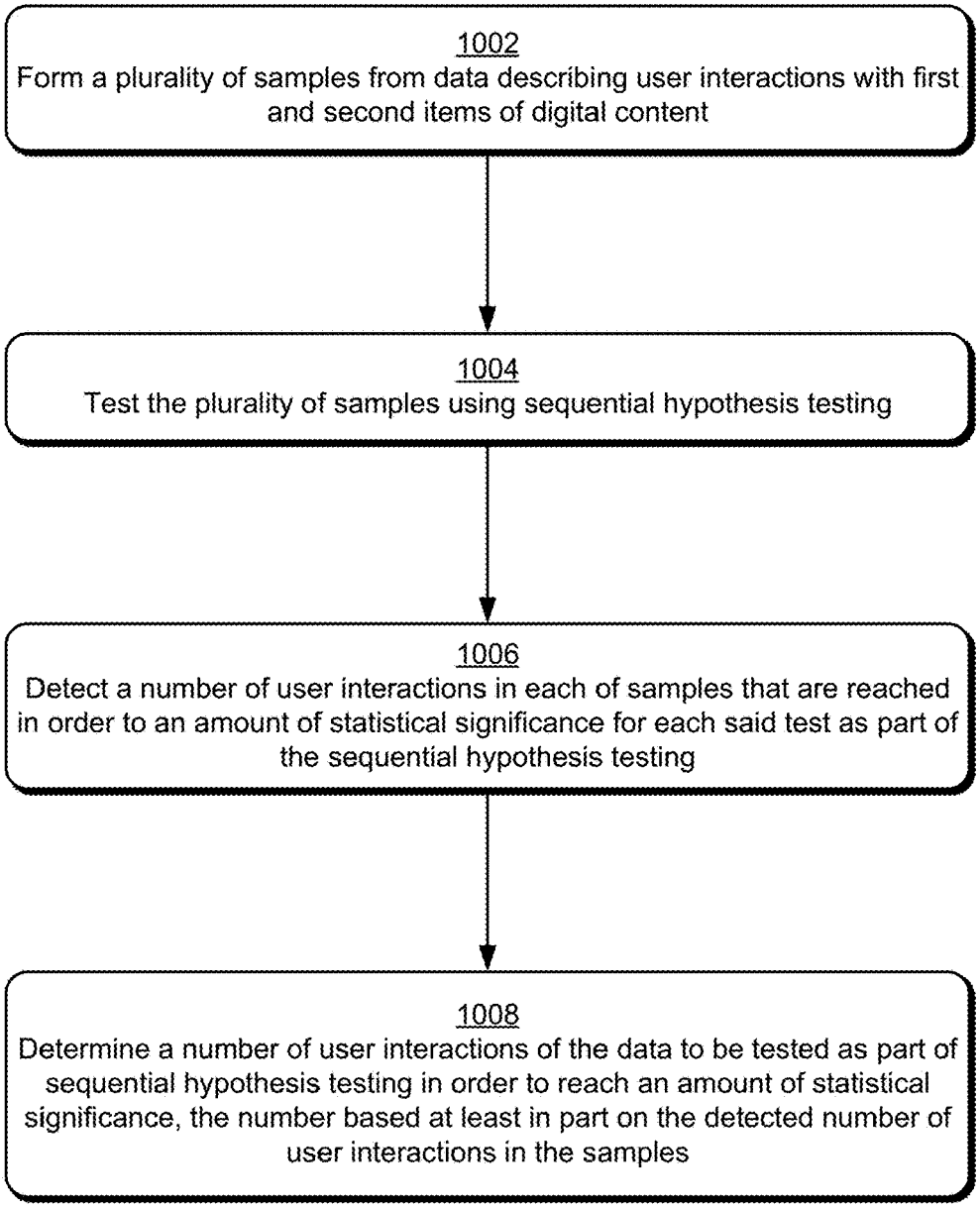
FIG. 10 is a flow diagram depicting a procedure in an example implementation in which a determination is made using a simulation as to a number of user interactions that are likely to be tested as part of sequential hypothesis testing.

FIG. 10 depicts a procedure 1000 in an example implementation in which a determination is made using a simulation as to a number of user interactions that are likely to be tested as part of sequential hypothesis testing. A plurality of samples is formed from data describing user interactions with first and second items of digital content (block 1002), e.g., through use of a Bernoulli sampling technique.

The plurality of samples is tested using sequential hypothesis testing (block 1004). The sequential testing module 208, for instance, may test the samples to simulate testing of the marketing data 110 as a whole. This may be performed a plurality of times. A number is detected of user interactions in each of samples that are reached in order to an amount of statistical significance for each said test as part of the sequential hypothesis testing (block 1006). A number is determined of user interactions of the data to be tested as part of sequential hypothesis testing in order to reach an amount of statistical significance, the number based at least in part on the detected number of user interactions in the samples (block 1008). The sample size determination module 602, for instance, may sore a result of each of these tests a compute an average from these stored samples. This average may thus serve as an estimate of a number of samples 604 likely to be tested form the marketing data 110 in order to achieve statistical significance and reject the null hypothesis. A variety of other examples are also contemplated as described above.

Example System and Device

Figure 11:
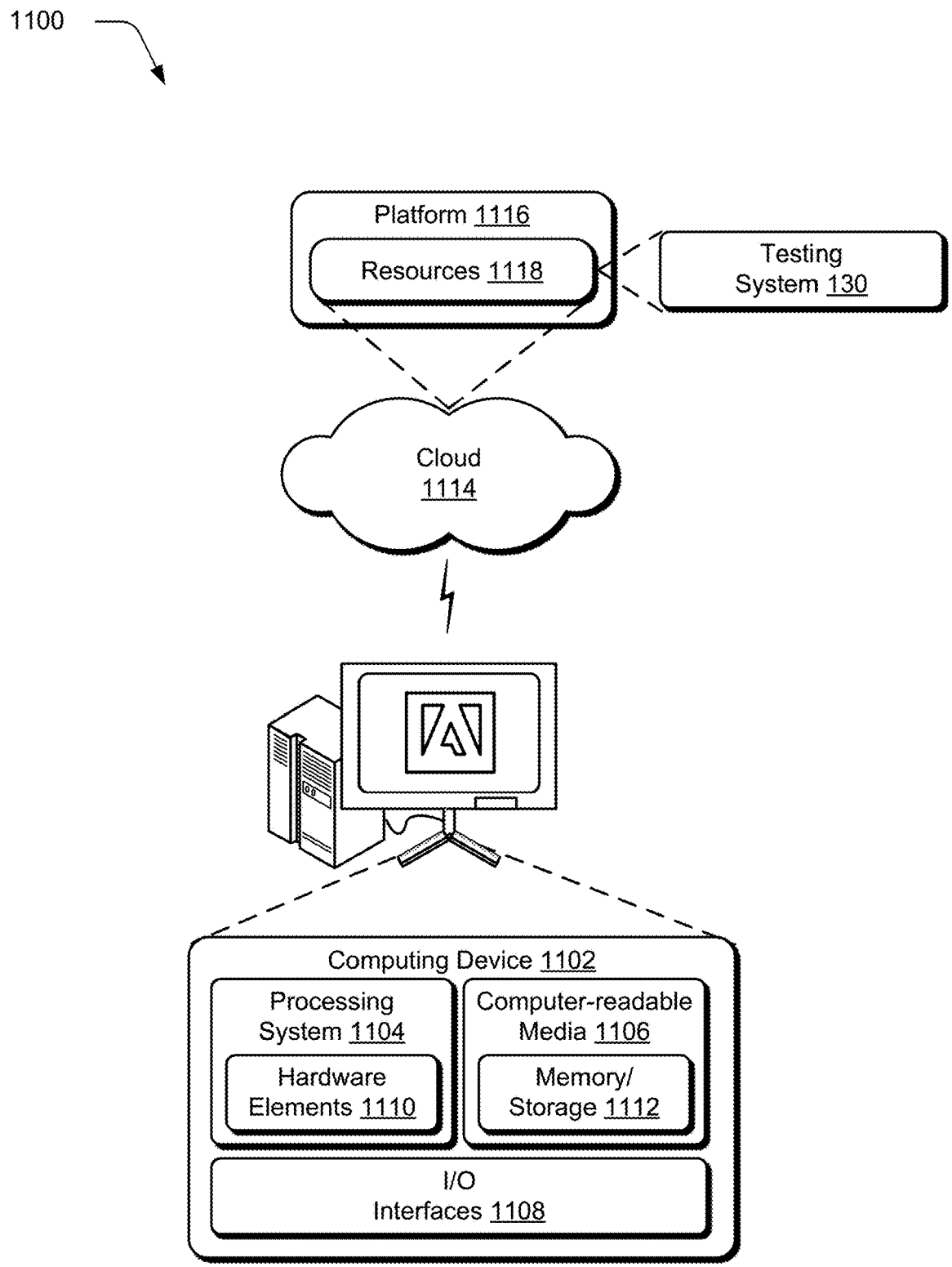
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the testing system 130. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium testing environment, a method implemented by at least one computing device, the method comprising:
   receiving, by the at least one computing device, an input parameter used to define an amount of statistical significance to perform sequential hypothesis testing;
   initiating, by the at least one computing device, the sequential hypothesis testing by collecting via a network, in real time, a first set of samples from data describing user interactions with a plurality of items of digital content;
   receiving, by the at least one computing device, a change to the input parameter during the collecting of the first set of samples from the data in real time, the change to the input parameter causing a change to the defined amount of statistical significance, the change to the defined amount of statistical significance is caused in real time as the sequential hypothesis testing is performed;
   continuing, by the at least one computing device, the sequential hypothesis testing by collecting via the network, in real time, a second set of samples from the data, the second set of samples determined by estimating a number of samples to reach statistical significance based on a difference between a first conversion rate for a first item of the plurality of items and a second conversion rate for a second item of the plurality of items and the change to the defined amount of statistical significance;
   completing, by the at least one computing device, the sequential hypothesis testing; and
   outputting, by the at least one computing device, a result of the sequential hypothesis testing in a user interface of a display device.

2. The method as described in claim 1, wherein the defined amount of statistical significance is based at least in part on an amount of permitted error.

3. The method as described in claim 2, wherein the amount of permitted error references both Type I errors that define false positives and Type II errors that define false negatives.

4. The method as described in claim 1, wherein the first set of samples are collected using a Bernoulli sampling technique.

5. In a digital medium testing environment, a method implemented by at least one computing device, the method comprising:
   receiving, by the at least one computing device, an input parameter used to define statistical significance to perform sequential hypothesis testing, the statistical significance defining a confidence level in accuracy of results of the sequential hypothesis testing;
   initiating, by the at least one computing device, the sequential hypothesis testing based on the defined statistical significance by collecting via a network, in real time, increasingly larger number of samples from data describing user interactions with a plurality of items of digital content;
   determining, by the at least one computing device, the confidence level in the accuracy of the results during the collecting of the samples in real time;
   receiving, by the at least one computing device, a change to the input parameter causing a change to the defined statistical significance, the change to the defined statistical significance caused in real time during the sequential hypothesis testing;
   completing, by the at least one computing device, the sequential hypothesis testing by estimating a number of samples using a difference between a first conversion rate for a first item of the plurality of items and a second conversion rate for a second item of the plurality of items and testing the estimated number of samples based on the change to the defined statistical significance; and
   outputting, by the at least one computing device, a result of the determining in a user interface in real time during the collecting of the samples as part of the sequential hypothesis testing.

6. The method as described in claim 5, wherein the statistical significance is based at least in part on an amount of permitted error that references both Type I errors that define false positives and Type II errors that define false negatives.

7. The method as described in claim 1, wherein the result of the sequential hypothesis testing is a determination whether to reject or not reject a null hypothesis.

8. The method as described in claim 1, wherein the input parameter includes a false discovery rate.

9. The method as described in claim 1, further comprising outputting in the user interface, in real time, a percentage of the sequential hypothesis testing completed.

10. The method as described in claim 1, further comprising outputting in the user interface, in real time, a time to complete the sequential hypothesis testing.

11. The method as described in claim 1, further comprising outputting in the user interface, in real time, a remaining number of sequential hypothesis tests to be performed.

12. The method as described in claim 5, further comprising outputting in the user interface, in real time, a percentage of the sequential hypothesis testing completed.

13. The method as described in claim 5, further comprising outputting in the user interface, in real time, a time to complete the sequential hypothesis testing.

14. The method as described in claim 5, further comprising outputting in the user interface, in real time, a remaining number of sequential hypothesis tests to be performed.

15. In a digital medium testing environment, a method implemented by at least one computing device, the method comprising:
   receiving, by the at least one computing device, an input parameter used to define statistical significance to perform sequential hypothesis testing, the statistical significance defining a confidence level in accuracy of results of the sequential hypothesis testing;
   initiating, by the at least one computing device, the sequential hypothesis testing based on the defined statistical significance by collecting via a network, in real time, increasingly larger number of samples from data describing user interactions with a plurality of items of digital content;

receiving, by the at least one computing device, a change to the input parameter causing a change to the defined statistical significance, the change to the defined statistical significance caused in real time during the sequential hypothesis testing;

continuing, by the at least one computing device, the sequential hypothesis testing by estimating a number of samples using a difference between a first conversion rate for a first item of the plurality of items and a second conversion rate for a second item of the plurality of items and testing the estimated number of samples based on the change to the defined statistical significance in real time;

determining, by the at least one computing device, an information output during the collecting of the samples in real time as part of the sequential hypothesis testing; and outputting, by the at least one computing device, the information output in a user interface in real time during the collecting of the samples as part of the sequential hypothesis testing.

16. The method as described in claim 15, wherein the information output is a determination whether to reject or not reject a null hypothesis.

17. The method as described in claim 15, wherein the input parameter includes a false discovery rate.

18. The method as described in claim 15, further comprising outputting in the user interface, in real time, a percentage of the sequential hypothesis testing completed.

19. The method as described in claim 15, further comprising outputting in the user interface, in real time, a time to complete the sequential hypothesis testing.

20. The method as described in claim 15, further comprising outputting in the user interface, in real time, a remaining number of sequential hypothesis tests to be performed.

* * * * *